(12) United States Patent
Pickering et al.

(10) Patent No.: US 7,074,488 B2
(45) Date of Patent: Jul. 11, 2006

(54) MONOFUNCTIONAL BRANCHED POLYSILOXANES, COMPOSITIONS AND PROCESSES OF PREPARING THE SAME

(75) Inventors: Jerry A. Pickering, Hilton, NY (US); Dinesh Tyagi, Fairport, NY (US); David F. Cahill, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 332 days.

(21) Appl. No.: 10/194,572

(22) Filed: Jul. 12, 2002

(65) Prior Publication Data

US 2003/0050420 A1 Mar. 13, 2003

Related U.S. Application Data

(60) Provisional application No. 60/305,874, filed on Jul. 18, 2001.

(51) Int. Cl.
| | |
|---|---|
| *B32B 25/20* | (2006.01) |
| *C08G 77/22* | (2006.01) |
| *C08G 77/26* | (2006.01) |
| *C08G 77/28* | (2006.01) |

(52) U.S. Cl. .................. 428/447; 525/474; 528/30; 528/38; 528/41

(58) Field of Classification Search ............. 428/447; 525/474
See application file for complete search history.

(56) References Cited

U.S. PATENT DOCUMENTS

| | | | | |
|---|---|---|---|---|
| 4,996,280 | A * | 2/1991 | Saho et al. ............. | 528/15 |
| 5,118,777 | A * | 6/1992 | Okawa .................. | 528/34 |
| 5,132,443 | A * | 7/1992 | Traver et al. ........... | 556/425 |
| 5,262,505 | A * | 11/1993 | Nakashima et al. ...... | 528/26 |
| 5,262,506 | A * | 11/1993 | Okawa et al. .......... | 528/27 |
| 5,378,789 | A * | 1/1995 | Raleigh et al. .......... | 528/29 |
| 5,516,361 | A | 5/1996 | Chow et al. | |
| 5,516,869 | A | 5/1996 | Lucarelli et al. | |
| 5,665,676 | A * | 9/1997 | Nakamura et al. ....... | 503/227 |
| 6,183,929 | B1 | 2/2001 | Chow et al. | |
| 6,534,615 | B1 * | 3/2003 | Schafer et al. .......... | 528/38 |
| 6,894,137 | B1 * | 5/2005 | Pickering ............... | 528/38 |

FOREIGN PATENT DOCUMENTS

EP 589440 A2 * 3/1994

OTHER PUBLICATIONS

EPO Search Report on EP Application No. 02015659.4, mailed Nov. 2002 (three pages: cover page; Search Report; and Annex with patent family information).

* cited by examiner

*Primary Examiner*—Jeffrey B. Robertson
(74) *Attorney, Agent, or Firm*—Carl F. Ruoff

(57) ABSTRACT

Branched monofunctional polysiloxanes are disclosed having the general formula:

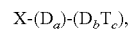

wherein $X$-$(D_a)$ is a linear moiety and $(D_b T_c)$ is a branched moiety; X a substituted or unsubstituted, monovalent or divalent hydrocarbon having a functional group;

D is

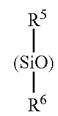

$R^5$ and $R^6$ are independently halogenated or unhalogenated monovalent hydrocarbon or substituted or unsubstituted divalent hydrocarbon;

T is $(R^7)_d SiO_{(4-d)/2}$ $R^7$ is a substituted or unsubstituted monovalent hydrocarbon; wherein the branched polysiloxane is end-capped by

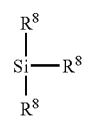

$R^8$ is a substituted or unsubstituted monovalent hydrocarbon; a is 1 to 300, b is 25 to 5000, c is 1 to 100, d is 0 or 1; and $T_c$ is randomly distributed in the branched polysiloxane. Additionally, processes for preparing such polysiloxanes, and coating compositions comprising the same is provided. A fuser member and substrate comprising a branched monofunctional polysiloxane of the above formula are also disclosed.

38 Claims, No Drawings

MONOFUNCTIONAL BRANCHED POLYSILOXANES, COMPOSITIONS AND PROCESSES OF PREPARING THE SAME

RELATED APPLICATIONS

This application claims benefit under 35 U.S.C. §119 (e) of prior U.S. Provisional Patent Application, Ser. No. 60/305,874, filed Jul. 18, 2001, which is incorporated herein by reference in its entirety.

BACKGROUND OF THE INVENTION

1. Field of the Invention

The present invention relates to monofunctional polysiloxanes having a branched structure, and processes for preparing the same. The branched monofunctional polysiloxanes are useful in electrophotographic operations to prevent adhesion of toner to the surface of a fuser member. In particular, the present invention is directed to coating compositions comprising branched monofunctional polysiloxanes. Additionally, the present invention is directed to a fuser member or other substrate comprising branched monofunctional polysiloxanes.

2. Background of the Invention and Related Information

Polysiloxanes are widely used in electrophotography as polymeric release agents to prevent adhesion of toner to the fuser member and deter toner offset. The polysiloxanes have anti-adhesive properties which are favorable to protect the surface of the fuser member and maintain the durability of the fuser member.

Modified polysiloxanes having functional groups provide a protective barrier by attaching to the fuser or toner surface via covalent bonds, hydrogen bonding, polar bonding, or other interaction between the functional groups and the fuser or toner surface. The interaction of the functional groups with the fuser or toner surface allows the polysiloxane to sterically block contact of the toner with the fuser member surface and provide a protective barrier. Monofunctional polysiloxanes with one reactive functional group may interact with the fuser member surface to provide a protective coating as well as increase the wetting of non-functional components in the polymeric release agent composition. Multifunctional polysiloxanes with more than one reactive group also interact in the same manner to provide a protective coating; however, the presence of more than one functional group may allow undesired simultaneous interaction with components other than the fuser surface such as toner. This simultaneous interaction can cause undesirable toner contamination of the fuser surface.

Functional polysiloxanes are described in U.S. Pat. No. 4,101,686 to Strella et al. which discloses polymeric release agents having functional groups such as carboxyl, hydroxy, epoxy, amino, isocyanate, thioether or mercapto groups. The polymeric release agents are applied to a heated fuser member to prevent toner adhesion. Similarly, U.S. Pat. No. 4,272,179 to Seanor and U.S. Pat. No. 4,264,181 to Lentz et al. disclose polymeric release agents having functional groups which are applied to the surface of a fuser member.

Additionally, U.S. Pat. Nos. 5,141,788 and 5,281,506 to Badesha et al. disclose a fuser member comprising a polyorganosiloxane having reactive functional groups which is grafted to the surface of the cured fluoroelastomer layer. U.S. Pat. No. 4,853,737 to Hartley et al. also discloses a fuser roll with an outer layer comprising a cured fluoroelastomer having polydiorganosiloxane segments that are covalently bonded to the backbone of the fluoroelastomer. The polydiorganosiloxanes have functional groups in which at least one of the functional groups are present on the polydiorganosiloxane chain to form the covalent bond to the fluoroelastomer backbone.

Furthermore, monoamino functional polyorganosiloxanes are disclosed in U.S. Pat. Nos. 5,531,813 and 5,512,409 to Henry et al. in which the monoamino functionality interacts with the hydrofluoroelastomer surface of a fuser member to provide a barrier to the toner as well as a low surface energy film to release the toner from the surface. Also, branched T-type monoamino functional polysiloxanes in which the reactive group is attached to a central silicon atom are disclosed in U.S. Pat. No. 5,516,361 to Chow et al.

Despite the interaction of the functional groups to the fuser surface to provide a protective barrier, polysiloxanes having one or more reactive functionalities may also react with the toner and/or paper components. For example, polysiloxanes with more than one functional group per molecule may react with other components such as paper debris and form an undesirable gel on the fuser surface. Also, the functional polysiloxane may react with both the fuser and toner or debris, and act as a glue to provide a contaminated coating on the fuser member.

Once a desired toner-formed image is fixed in its intended location on a receiver, such as paper, it may be subjected to contact by other surfaces that will cause displacement of toner therefrom. This displacement may be in the form of smearing and/or transfer to the contacting surface, and is referred to as toner marking.

It is known that toner marking can be combated by a number of methods. Among these are including wax additives in the toner, increasing the toughness of the toner, adding release lubricants to the toner surface, and reducing the force of contact causing the toner marking. Such release lubricants added to toner have included functional polysiloxanes.

Additionally, functional polysiloxanes with a linear chain provide a protective barrier by forming a mushroom shape above the functional group attachment site; however, shear force can deform the shape and stretch the polymeric chain to expose the previously protected surface. Functional polysiloxanes with a branched chain may provide more resistance to shear force and prevent being stretched physically into a simple thin, linear chain; however, a bulky branched group may sterically impede interaction of the functional group with the surface.

Numerous attempts have been made to improve toner offset with functional polysiloxanes; however, there still remains a need in the art for polysiloxanes with anti-adhesive properties which provide good protection of the fuser surface without interaction with both the toner, fuser and/or debris. The present invention provides functional polysiloxanes which protect the fuser member and toned image surface with resistance to shear force, and without steric hindrance to allow effective interaction of the functional group with the fuser surface.

SUMMARY OF THE INVENTION

The present invention relates to monofunctional branched polysiloxanes, compositions comprising the branched polysiloxanes, and processes for preparing the same. The present invention is also directed to a fuser member or other substrate comprising the branched monofunctional polysiloxane for use in electrophotography.

In particular, the present invention is advantageous in providing improved anti-adhesive properties and good protection of the fuser surface without interacting with the toner, fuser and/or debris.

The present invention provides branched polysiloxanes having the general formula:

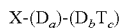

wherein X-(D$_a$) is a linear moiety and (D$_b$T$_c$) is a branched moiety; and where X is a substituted or unsubstituted, monovalent or divalent C$_1$ to C$_{10}$ hydrocarbon having a functional group where the functional group comprises amino, hydroxyl, mercapto, carboxylic acid or anhydride, carboxyl, phenol or silane;

D is:

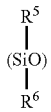

where R$^5$ and R$^6$ are independently halogenated or unhalogenated C$_1$ to C$_{10}$ monovalent hydrocarbon or substituted or unsubstituted C$_1$ to C$_{10}$ monovalent hydrocarbon;

T is:

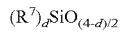

where R$^7$ is a substituted or unsubstituted monovalent C$_1$ to C$_{10}$ hydrocarbon; wherein the branched polysiloxane is end-capped by

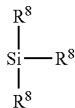

where R$^8$ is a substituted or unsubstituted monovalent C$_1$ to C$_{10}$ hydrocarbon; and a is 1 to 300, b is 25 to 5000, c is 1 to 100 (and preferably 2 to 100), d is 0 or 1; and T$_c$ is randomly distributed in the branched moiety.

In a preferred embodiment of the present invention, X comprises mercapto, amino or carboxylic acid. More preferably, X comprises amino. Most preferably, X is (R$^1$)$_2$N—R$^2$—(NR$^3$ R$^4$)$_n$—, where R$^1$ is hydrogen or monovalent C$_1$ to C$_{10}$ hydrocarbon; R$^2$ is a substituted or unsubstituted divalent C$_1$ to C$_{10}$ hydrocarbon; R$^3$ is hydrogen or monovalent C$_1$ to C$_8$ hydrocarbon; R$^4$ is a divalent substituted or unsubstituted C$_1$ to C$_{10}$ hydrocarbon; and n is 0 to 5.

Additionally, the branched polysiloxane of the present invention has a mole ratio of functional group:Si atom range from about 1:5400 to 1:28. Most preferably, the branched polysiloxane has a mole ratio of functional group:Si atom range from about 1:2000 to 1:60.

The viscosity of the branched polysiloxane of the present invention is from about 10 to about 200,000 cSt at 25° C. Most preferably, the viscosity of the branched polysiloxane is from about 200 to about 60,000 cSt at 25° C.

The molecular weight range of the branched polysiloxane of the present invention is from about 800,000 to about 2,100 Daltons. Most preferably, the molecular weight range of the branched polysiloxane is from about 150,000 to about 9,000 Daltons.

Suitable branched polysiloxanes of the present invention include branched dimethylsiloxanes, diphenylsiloxanes, methyl-3,3,3-trifluoropropylsiloxanes, diphenyl(dimethyl) siloxanes, methylphenylsiloxanes, or copolymers thereof. Most preferably, suitable branched polysiloxanes of the present invention include branched dimethylsiloxanes.

In another preferred embodiment of the present invention, the branched polysiloxanes have the formula:

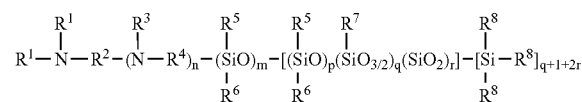

wherein p is 25 to 5000; q+r is 1 to 100 (and preferably 2 to 100); p+q+r is at least 27; R$^1$ is hydrogen or monovalent C$_1$ to C$_{10}$ hydrocarbon; R$^2$ is a substituted or unsubstituted divalent C$_1$ to C$_{10}$ hydrocarbon; R$^3$ is hydrogen or monovalent C$_1$ to C$_8$ hydrocarbon; R$^4$ is a substituted or unsubstituted divalent C$_1$ to C$_8$ hydrocarbon; R$^5$, R$^6$, R$^7$ and R$^8$ are independently monovalent C$_1$ to C$_{10}$ hydrocarbon; n is 0 to 5; m is 1 to 100; and r is 0 to 100. More preferably, the branched polysiloxane has the formula:

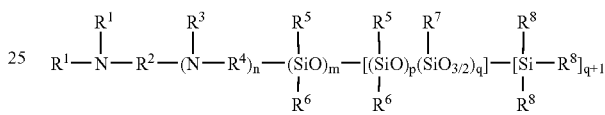

wherein p is 50 to 2000; q is 1 to 20 (and preferably 2 to 20); p+q is at least 52; R$^1$ is hydrogen or monovalent C$_1$ to C$_{10}$ hydrocarbon; R$^2$ is a substituted or unsubstituted divalent C$_1$ to C$_{10}$ hydrocarbon; R$^3$ is hydrogen or monovalent C$_1$ to C$_8$ hydrocarbon; R$^4$ is a substituted or unsubstituted divalent C$_1$ to C$_8$ hydrocarbon; R$^5$, R$^6$, R$^7$ and R$^8$ are independently monovalent C$_1$ to C$_{10}$ hydrocarbon; n is 0 to 1; and m is 1 to 100. Most preferably, the branched polysiloxane has the formula:

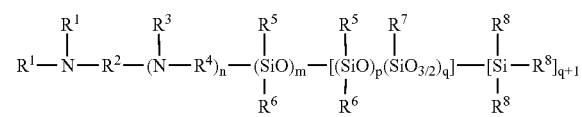

wherein p is 50 to 300; q is 2 to 20; p+q is at least 52; R$^1$ is hydrogen or monovalent C$_1$ to C$_{10}$ hydrocarbon; R$^2$ is a substituted or unsubstituted divalent C$_1$ to C$_{10}$ hydrocarbon; R$^3$ is hydrogen or monovalent C$_1$ to C$_8$ hydrocarbon; R$^4$ is a substituted or unsubstituted divalent C$_1$ to C$_8$ hydrocarbon; R$^5$, R$^6$, R$^7$ and R$^8$ are independently monovalent C$_1$ to C$_{10}$ hydrocarbon; n is 0 to 1; and m is 1 to 100. Most preferably, the branched polysiloxanes have the formula:

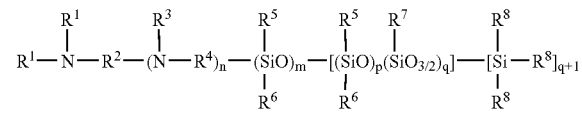

wherein p is 50 to 300; q is 2 to 20; p+q is at least 52; d is 1 or 2; R$^1$ is hydrogen or monovalent C$_1$ to C$_{10}$ hydrocarbon; R$^2$ is a substituted or unsubstituted divalent C$_1$ to C$_{10}$ hydrocarbon; R$^3$ is hydrogen or monovalent C$_1$ to C$_8$ hydrocarbon; R$^4$ is a substituted or unsubstituted divalent C$_1$ to C$_8$ hydrocarbon; $R^5$, $R^6$, $R^7$ and $R^8$ are independently monovalent $C_1$ to $C_{10}$ hydrocarbon; n is 0; and m is 1 to 50.

Additionally, in a preferred embodiment of the present invention, the branched polysiloxane has the formula:

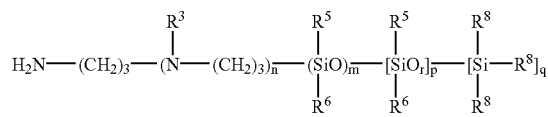

wherein $R^3$ is hydrogen or monovalent $C_1$ to $C_8$ hydrocarbon; wherein $R^5$, $R^6$, and $R^8$ are independently monovalent $C_1$ to $C_{10}$ hydrocarbon; and wherein n is 0 to 5; m is 1 to 100; p is 25 to 2000; r is 1.1 to 1.001; and q is 2 to 100 or sufficient to endcap the polysiloxane chain. Most preferably, the branched polysiloxane has the formula:

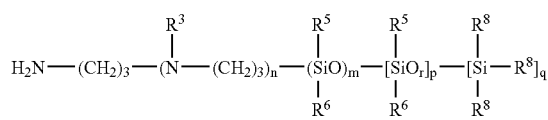

wherein $R^3$ is hydrogen or monovalent $C_1$ to $C_8$ hydrocarbon; wherein $R^5$, $R^6$, and $R^8$ are independently monovalent $C_1$ to $C_{10}$ hydrocarbon; and wherein n is 0 to 1; m is 1 to 50; p is 50 to 3000; r is 1.1 to 1.001; and q is 2 to 20.

Further, in a preferred embodiment of the present invention, the branched polysiloxane is a copolymer having the formula:

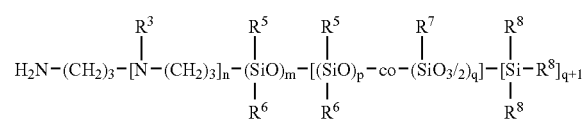

wherein $R^3$ is hydrogen or monovalent $C_1$ to $C_8$ hydrocarbon; wherein $R^5$, $R^6$, $R^7$, and are independently monovalent $C_1$ to $C_{10}$ hydrocarbon; and wherein n is 0 to 5; m is 1 to 100; p is 25 to 2000; and q is 1 to 100 (and preferably 2 to 100). Most preferably, the branched polysiloxane is a copolymer having the formula:

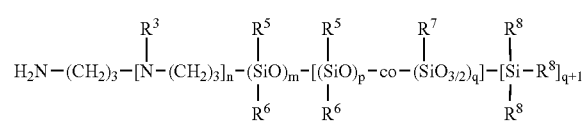

wherein $R^3$ is hydrogen or monovalent $C_1$ to $C_8$ hydrocarbon; wherein $R^5$, $R^6$, $R^7$, and $R^8$ are independently monovalent $C_1$ to $C_{10}$ hydrocarbon; and wherein n is 0 to 1; m is 1 to 50; p is 50 to 300; and q is 2 to 20.

Further still, in a preferred embodiment of the present invention, the branched polysiloxane is a copolymer having the formula:

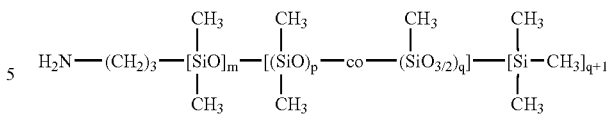

wherein m is 1 to 100, p is 50 to 2000, q is 1 to 50 (and preferably 2 to 50), and p+q is at least 51. Most preferably, the branched polysiloxane is a copolymer having the formula:

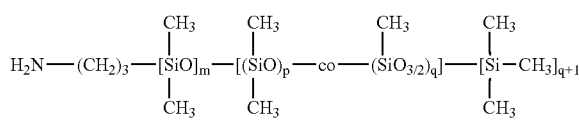

wherein m is 1 to 50, p is 50 to 300, q is 2 to 20, and p+q is at least 52.

Even further, in a preferred embodiment of the present invention, the branched polysiloxane is a copolymer having the formula:

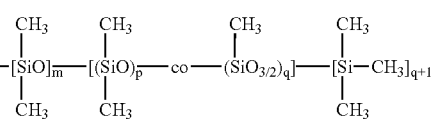

where m is 1 to 100, p is 50 to 2000, and q is 1 to 50 (and preferably 2 to 50). Most preferably, m is 1 to 50, p is 50 to 300, and q is 2 to 20.

The branched polysiloxane of the present invention have a thermal stability of at least about 120° C., and most preferably of at least about 150° C.

In a most preferred embodiment of the present invention, the branched polysiloxane has a viscosity from about 200 to about 60,000 cSt, a weight average molecular weight range from about 150,000 to about 9,000 Daltons, a mole ratio of functional group:Si atom range from about 1:2000 to 1:60; wherein the branched polysiloxane is dimethylsiloxane; and wherein the functional group is amino.

The present invention is also directed to coating compositions comprising at least one diluent and at least one branched polysiloxane having the formula:

$$X\text{-}(D_a)\text{-}(D_bT_c),$$

wherein $X\text{-}(D_a)$ is a linear moiety and $(D_bT_c)$ is a branched moiety; where X is a substituted or unsubstituted, monovalent or divalent $C_1$ to $C_{10}$ hydrocarbon having a functional group where the functional group comprises amino, hydroxyl, mercapto, carboxylic acid or anhydride, carboxyl, phenol or silane;

D is

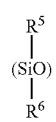

where $R^5$ and $R^6$ are independently halogenated or unhalogenated $C_1$ to $C_{10}$ monovalent hydrocarbon or substituted or unsubstituted $C_1$ to $C_{10}$ monovalent hydrocarbon;

T is

where $R^7$ is a substituted or unsubstituted monovalent $C_1$ to $C_{10}$ hydrocarbon;

wherein the branched polysiloxane is end-capped by

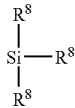

where $R^8$ is a substituted or unsubstituted monovalent $C_1$ to $C_{10}$ hydrocarbon; and wherein a is 1 to 300, b is 25 to 5000, c is 1 to 100 (preferably 2 to 100), d is 0 or 1; and wherein $T_c$ is randomly distributed in the branched moiety, or derivatives thereof.

Suitable diluents of the present invention include functional polysiloxanes, nonfunctional polysiloxanes or mixtures thereof. Most preferably, diluents of the present invention include nonfunctional polysiloxanes optionally having diphenylsiloxane or methylphenylsiloxane groups.

The final concentration of branched polysiloxanes of the present invention in diluent is from about 0.5% by weight to 80% by weight based on the total weight of the coating composition. Most preferably, the final concentration of branched polysiloxanes in diluent is from about 2% by weight to 15% by weight based on the total weight of the coating composition.

The final viscosity of branched polysiloxanes of the present invention in diluent is from about 100 to about 100,000 cSt at 25° C. Most preferably, the final viscosity of branched polysiloxanes in diluent is from about 200 to about 60,000 cSt at 25° C.

The branched polysiloxanes of the present invention have a thermal stability of at least about 120° C., and most preferably of at least about 150° C.

In a most preferred embodiment of the coating composition of the present invention, the branched polysiloxane has a viscosity from about 200 to about 60,000 cSt, a weight average molecular weight range from about 150,000 to about 9,000 Daltons, a mole ratio of functional group:Si atom range from about 1:2000 to 1:60; wherein the branched polysiloxane is dimethylsiloxane; wherein the functional group is amino; wherein the diluent includes functional polysiloxane, non-functional polysiloxanes, or mixtures thereof, and the polysiloxanes have a viscosity from about 250 to about 60,000 cSt at 25° C.; and wherein the final concentration of branched polysiloxane in diluent is from about 2% by weight to about 15 by weight, and the final viscosity of the branched polysiloxane in diluent is from about 200 to about 60,000 cSt at 25° C.

Additionally, the present invention is directed to fuser members comprising a (a) substrate; (b) fluoropolymer; and (c) polymeric release agent wherein the polymeric release agent comprises at least one branched polysiloxane having the formula:

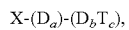

wherein $X-(D_a)$ is a linear moiety and $(D_bT_c)$ is a branched moiety; where

X is a substituted or unsubstituted, monovalent or divalent $C_1$ to $C_{10}$ hydrocarbon having a functional group where the functional group comprises amino, hydroxyl, mercapto, carboxylic acid or anhydride, carboxyl, phenol or silane;

D is

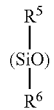

where $R^5$ and $R^6$ are independently halogenated or unhalogenated $C_1$ to $C_{10}$ monovalent hydrocarbon or substituted or unsubstituted $C_1$ to $C_{10}$ monovalent hydrocarbon;

where T is

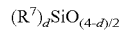

where $R^7$ is a substituted or unsubstituted monovalent $C_1$ to $C_{10}$ hydrocarbon; wherein the branched polysiloxane is end-capped by

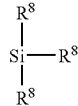

where $R^8$ is a substituted or unsubstituted monovalent $C_1$ to $C_{10}$ hydrocarbon; and wherein a is 1 to 300, b is 25 to 5000, c is 1 to 100 (and preferably 2 to 100), d is 0 or 1; and wherein $T_c$ is randomly distributed in the branched moiety.

Suitable fluoropolymers of the present invention include fluoroelastomer or fluorocarbon resin. Preferably, the fluoroelastomer includes copolymer of vinylidene fluoride with hexafluoropropylene, copolymer of vinylidene fluoride with tetrafluoroethylene and hexafluoropropylene, copolymer of perfluoroalkylvinylether with tetrafluoroethylene, copolymer of ethylene perfluoroalkylvinylether with tetrafluoroethylene, or mixtures thereof.

In one embodiment of the present invention, the vinylidene fluoride is present in the fluoroelastomer at a concentration from about 30 to about 90 mole percent.

In another embodiment of the present invention, the hexafluoropropylene is present in the fluoroelastomer at a concentration from about 10 to about 60 mole percent.

In still another embodiment of the present invention, the tetrafluoroethylene is present in the fluoroelastomer at a concentration from about 0 to about 50 mole percent.

The fluoroelastomer of the present invention may further include a filler. Preferably, the filler is a metal, metal,alloy, metal oxide, metal salt, silicon carbide, boron nitride, graphite or silicon dioxide. The metal oxide may include aluminum oxide, iron oxide, tin oxide, copper oxide, zinc oxide or silicon oxide.

The filler of the present invention is in a concentration range from about 0% by volume to about 40% by volume based on the weight of the fluoroelastomer. Most preferably, the filler is present in a concentration range from about 1% by volume to about 35% by volume based on the weight of the fluoroelastomer.

Further, in a most preferred embodiment of the apparatus of the present invention, the branched polysiloxane has a viscosity from about 200 to about 60,000 cSt, a weight average molecular weight range from about 150,000 to about 9,000 Daltons, a mole ratio of functional group:Si atom range from about 1:2000 to 1:60; wherein the branched polysiloxane is dimethylsiloxane; wherein the functional group is amino; wherein the diluent comprises functional polysiloxane, non-functional polysiloxanes, or mixtures thereof, and the polysiloxanes have a viscosity from about 250 to about 60,000 cSt at 25° C.; wherein the final concentration of branched polysiloxane in diluent is from about 2% by weight to about 15% by weight, and the final viscosity of the branched polysiloxane in diluent is from about 200 to about 60,000 cSt at 25° C.; and wherein the fluoropolymer is a fluoroelastomer, and the fluoroelastomer comprises copolymer of vinylidene fluoride with hexafluoropropylene, copolymer of vinylidene fluoride with tetrafluoroethylene and hexafluoropropylene, copolymer of perfluoroalkylvinylether with tetrafluoroethylene, copolymer of ethylene perfluoroalkylvinylether with tetrafluoroethylene, or mixtures thereof; wherein the filler is metal oxide, and the metal oxide comprises aluminum oxide, iron oxide, tin oxide, copper oxide, zinc oxide or silicon oxide; and wherein the filler is present in a concentration range from about 1% by volume to about 35% by volume based on the volume of the fluoroelastomer.

A substrate is also provided in the present invention comprising at least one fluoropolymer and a polymeric release agent comprising at least one branched polysiloxane having the general formula:

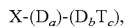
X-$(D_a)$-$(D_bT_c)$, wherein X-$(D_a)$ is a linear moiety and $(D_bT_c)$ is a branched moiety; where X is a substituted or unsubstituted, monovalent or divalent $C_1$ to $C_{10}$ hydrocarbon having a functional group where the functional group comprises amino, hydroxyl, mercapto, carboxylic acid or anhydride, carboxyl, phenol or silane;

D is:

D is:

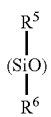

where $R^5$ and $R^6$ are independently halogenated or unhalogenated $C_1$ to $C_{10}$ monovalent hydrocarbon or substituted or unsubstituted $C_1$ to $C_{10}$ monovalent hydrocarbon;

T is $(R^7)_dSiO(4-d)/2$ where $R^7$ is a substituted or unsubstituted monovalent $C_1$ to $C_{10}$ hydrocarbon; wherein the branched polysiloxane is end-capped by

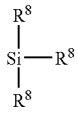

where $R^8$ is a substituted or unsubstituted monovalent $C_1$ to $C_{10}$ hydrocarbon; and a is 1 to 300, b is 25 to 5000, c is 1 to 100 (and preferably 2 to 100), d is 0 or 1; and wherein $T_c$ is randomly distributed in the branched moiety.

One embodiment of the present invention further comprises individually applying at least one fluoropolymer and at least one branched polysiloxane to the fuser surface.

In another embodiment, the polymeric release agent is a continuously renewable coating.

In still another embodiment, at least one fluoropolymer and at least one branched polysiloxane are reacted at a temperature range from about 120° C. to about 240° C., most preferably at a temperature range from about 170° C. to about 200° C.

Even further, in a most preferred embodiment of the substrate of the present invention, the branched polysiloxane has a viscosity from about 200 to about 60,000 cSt, a weight average molecular weight range from about 150,000 to about 9,000 Daltons, a mole ratio of functional group:Si atom range from about 1:2000 to 1:60; wherein the branched polysiloxane has a thermal stability from at least 150° C., and the branched polysiloxane is dimethylsiloxane; wherein the functional group is amino; wherein the diluent comprises functional polysiloxane, non-functional polysiloxanes, or mixtures thereof, and the polysiloxanes have a viscosity from about 250 to about 60,000 cSt at 25° C.; wherein the final concentration of branched polysiloxane in diluent is from about 2% by weight to about 15% by weight, and the final viscosity of the branched polysiloxane in diluent is from about 200 to about 60,000 cSt at 25° C.; and wherein the fluoropolymer is a fluoroelastomer, and the fluoroelastomer comprises copolymer of vinylidene fluoride with hexafluoropropylene, copolymer of vinylidene fluoride with tetrafluoroethylene and hexafluoropropylene, copolymer of perfluoroalkylvinylether with tetrafluoroethylene, copolymer of ethylene perfluoroalkylvinylether with tetrafluoroethylene, or mixtures thereof; wherein the filler is metal oxide, and the metal oxide comprises aluminum oxide, iron oxide, tin oxide, copper oxide, zinc oxide or silicon oxide; wherein the filler is present in a concentration range from about 1% by volume to about 35% by volume based on the volume of the fluoroelastomer; and wherein the fluoroelastomer and at least one branched polysiloxane react at a temperature range form about 150° C. to about 200° C.

The present invention is also directed to a method for preparing a monofunctional branched polysiloxane which comprises reacting at least one of a first reactant selected from:
  (1) a functional terminated siloxane, or
  (2) a functional silanol terminated siloxane, and at least one of a second reactant selected from:
  (1) a tri- or tetra-siloxy functional silane, or
  (2) a non-functional branched siloxane comprising tris or tetrakis siloxy units, in the presence of a basic or acidic catalyst. The monofunctional branched polysiloxane has the general formula:

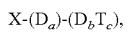
X-$(D_a)$-$(D_bT_c)$, wherein X-$(D_a)$ is a linear moiety and $(D_bT_c)$ is a branched moiety; where X is a substituted or unsubstituted, monovalent or divalent $C_1$ to $C_{10}$ hydrocarbon having a functional group where the functional group comprises amino, hydroxyl, mercapto, carboxylic acid or anhydride, carboxyl, phenol or silane;

D is

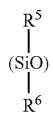

where $R^5$ and $R^6$ are independently halogenated or unhalogenated $C_1$ to $C_{10}$ monovalent hydrocarbon or substituted or unsubstituted $C_1$ to $C_{10}$ monovalent hydrocarbon;

T is $(R^7)_d SiO_{(4-d)/2}$ where $R^7$ is a substituted or unsubstituted monovalent $C_1$ to $C_{10}$ hydrocarbon; wherein the branched polysiloxane is end-capped by

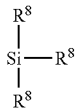

where $R^8$ is a substituted or unsubstituted monovalent $C_1$ to $C_{10}$ hydrocarbon; and wherein a is 1 to 300, b is 25 to 5000, c is 1 to 100 (and preferably 2 to 100), d is 0 or 1; and wherein $T_c$ is randomly distributed in the branched moiety.

Suitable functional silanol terminated silanes or siloxanes for preparing polysiloxanes of the present invention include those having the general formula:

$X_1 - M_1 - (Si(M_2)_2 O)_n - M_3$ where $M_1$ is a divalent $C_1$ to $C_{14}$ substituted or unsubstituted hydrocarbon, n is 1 to 2500 (and preferably 1 to 1000), $M_2$ is a monovalent $C_1$ to $C_{10}$ substituted or unsubstituted hydrocarbon, $M_3$ is a monovalent $C_1$ to $C_{12}$ substituted or unsubstituted hydrocarbon and $X_1$ is a substituted or unsubstituted, monovalent $C_1$ to $C_{10}$ hydrocarbon having a functional group comprising amino hydroxyl, mercapto, carboxylic acid or anhydride, carboxyl, phenol, silane, epoxy, acrylate or vinyl. Most preferably, $M_1$ is a divalent $C_1$ to $C_{10}$ substituted or unsubstituted hydrocarbon, n is 1, $M_2$ is a monovalent $C_1$ to $C_8$ substituted or unsubstituted hydrocarbon, $M_3$ is a monovalent $C_1$ to $C_8$ substituted or unsubstituted hydrocarbon and $X_1$ is a substituted or unsubstituted, monovalent $C_1$ to $C_{10}$ hydrocarbon having a functional group comprising amino.

The silanol terminated siloxanes of the present invention include silanol terminated polydimethylsiloxane.

Suitable functional terminated siloxanes for preparing branched polysiloxanes of the present invention include those having formula:

$X_1 - M_4(Si(M_5)_2 - O)_m - Si(M_5)_2 - M_6 - X_n$ where $M_4$ is a monovalent or divalent $C_1$ to $C_{14}$ substituted or unsubstituted hydrocarbon, $M_5$ is a monovalent $C_1$ to $C_{12}$ substituted or unsubstituted hydrocarbon, $M_6$ is a divalent $C_1$ to $C_{12}$ substituted or unsubstituted hydrocarbon, $X_1$ is a monovalent $C_1$ to $C_{10}$ substituted or unsubstituted hydrocarbon having a functional group comprising amino, hydroxyl, mercapto, carboxylic acid or anhydride, carboxyl, phenol, silane, phenol, epoxy, acrylate or vinyl, n is 0 or 1, and m is 1 to 2500. Most preferably, $M_4$ is a divalent $C_1$ to $C_{10}$ substituted or unsubstituted hydrocarbon, $M_5$ is a monovalent $C_1$ to $C_8$ substituted or unsubstituted hydrocarbon, $M_6$ is a divalent $C_1$ to $C_8$ substituted or unsubstituted hydrocarbon, $X_1$ is a substituted or unsubstituted hydrocarbon, monovalent $C_1$ to $C_{10}$ hydrocarbon having a functional group comprising amino, n is 1, and m is 1 to 1000; or $M_4$ is a divalent $C_1$ to $C_{10}$ substituted or unsubstituted hydrocarbon, $M_5$ is a monovalent $C_1$ to $C_8$ substituted or unsubstituted hydrocarbon, $M_6$ is a monovalent $C_1$ to $C_8$ substituted or unsubstituted hydrocarbon, $X_1$ is a substituted or unsubstituted hydrocarbon, monovalent or divalent $C_1$ to $C_{10}$ hydrocarbon having a functional group comprising amino, n is 0, and m is 1 to 1000.

Suitable functional terminated siloxanes used in the present invention include aminopropyl terminated polydimethylsiloxane.

Suitable siloxy functional silane for preparing polysiloxanes of the present invention have the tri-siloxy general formula:

$M_7 - Si(O-M_8)_3$ where $M_7$ and $M_8$ are monovalent $C_1$ to $C_{12}$ substituted or unsubstituted hydrocarbons; or the tetra-siloxy general formula:

$Si(O-M_9)_4$ where $M_9$ is a $C_1$ to $C_{12}$ monovalent substituted or unsubstituted hydrocarbon. Most preferably, $M_7$ and $M_8$ are monovalent $C_1$ to $C_8$ substituted or unsubstituted hydrocarbons, and $M_9$ is a $C_1$ to $C_8$ monovalent substituted or unsubstituted hydrocarbon.

Suitable tri-siloxy functional silanes used in the present invention include methyl trimethoxysilane or methyl triethoxysilane.

Suitable tetra-siloxy functional silanes used in the present invention include tetramethoxysilane or tetraethoxysilane.

Non-functional branched siloxanes comprising tris or tetrakis siloxy units useful for preparing branched polysiloxanes of the present invention include those with the general formula:

$(D_a T_b)$, wherein
D is

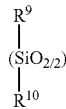

where $R^9$ and $R^{10}$ are independently halogenated or unhalogenated $C_1$ to $C_{10}$ monovalent hydrocarbon or substituted or unsubstituted $C_1$ to $C_{10}$ monovalent hydrocarbon;

T is $(R^{11})_d SiO_{(4-d)/2}$ where $R^{11}$ is a substituted or unsubstituted monovalent $C_1$ to $C_{10}$ hydrocarbon; wherein the polysiloxane is end-capped by

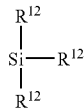

where $R^{12}$ is a substituted or unsubstituted monovalent $C_1$ to $C_{10}$ hydrocarbon; and wherein a is 0 to 5000, b is 1 to 100 (and preferably 2 to 100), d is 0 or 1; and wherein $T_b$ is randomly distributed in the branched siloxane.

Suitable branched siloxanes comprising tris units used in the present invention include methyl tris(trimethylsiloxy) silane or methyl tris(trimethylsiloxy)disiloxane, or derivatives thereof.

Suitable branched siloxanes comprising tetrakis units used in the present invention include tetrakis(trimethylsiloxy)silane or tetrakis(trimethylsiloxy)disiloxane, or derivatives thereof.

Suitable branched siloxanes comprising tris or tetrakis units include those prepared by incorporation of a cyclic siloxane monomer, such as octamethylcyclotetrasiloxane, into branched siloxanes described herein.

In the present invention, the branched polysiloxane may be prepared at a temperature range from about 20° C. to about 180° C., and most preferably at a temperature range from about 60° C. to about 120° C.

The branched polysiloxane of the present invention may be prepared at a pH range from about 9 to about 14. The branched polysiloxane of the present invention may be prepared in the presence of a basic catalyst including potassium hydroxide, tetramethylammonium hydroxide, tetrabutylphosphonium hydroxide, silanoates or mixtures thereof.

Alternatively, the branched polysiloxane of the present invention may be prepared at a pH range from about 2 to about 5. The branched polysiloxane of the present invention may be prepared in the presence of an acidic catalyst including hydrochloric acid, sulfuric acid, trifluoromethanesulfonic acid or mixtures thereof.

The branched polysiloxane of the present invention may contain a fraction of branched polysiloxane residues having more than one functional group. Preferably, the fraction of branched polysiloxane residues having more than one functional group is less than about 50%, and most preferably the fraction of branched polysiloxane residues having more than one functional group is less than about 10%.

DETAILED DESCRIPTION OF THE INVENTION

The present invention is directed to monofunctional polysiloxanes having a branched structure which provide good protection of the fuser member surface. The branched monofunctional polysiloxanes of the present invention allow interaction of the functional group with the fuser surface without steric hindrance. Additionally, the branched, bulky chain provides resistance to shear force and cannot be stretched to become or resemble a linear chain. The branched polysiloxanes of the present invention also possess a temperature stability of preferably at least 120° C., more preferably of at least 135° C., and most preferably of at least 150° C. Furthermore, the branched polysiloxanes of the present invention are resistant to oil gelling and cannot interact simultaneously with the fuser surface and toner and/or debris.

As used herein, the term "hydrocarbon" refers to aliphatic, cycloaliphatic or aromatic. The hydrocarbon groups are understood to include alkanol, alkyl, haloalkyl, alkylene, aryl, aralkyl, aralkylene, alkarylene, arylene or alkenyl groups. Further, hydrocarbon is understood to include saturated or unsaturated, cyclic, branched or linear, non-substituted hydrocarbon groups, and saturated or unsaturated, cyclic, branched or linear, substituted hydrocarbon groups, with the latter referring to the hydrocarbon portion bearing additional substituents, besides carbon and hydrogen. Preferred hydrocarbon groups include alkyl (such as methyl or ethyl) or haloalkyl (such as halomethyl or haloethyl) groups, and most preferred hydrocarbon groups include alkyl groups.

The monofunctional branched polysiloxanes of the present invention have the following general formula:

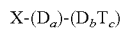

where $(D_a)$ is a linear moiety, $(D_bT_c)$ is a branched moiety, a is 1 to 300, b is 25 to 5000, c is 1 to 100 (and preferably 2 to 100), and $T_c$ is randomly distributed in the branched moiety;

D is:

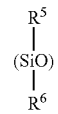

where $R^5$ and $R^6$ are independently halogenated or unhalogenated $C_1$ to $C_{10}$ monovalent hydrocarbon or substituted or unsubstituted $C_1$ to $C_{10}$ monovalent hydrocarbon;

T is

where $R^7$ is substituted or unsubstituted monovalent $C_1$ to $C_{10}$ hydrocarbon, and d is 0 or 1; wherein the branched polysiloxane is end-capped by

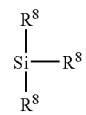

where $R^8$ is a substituted or unsubstituted monovalent $C_1$ to $C_{10}$ hydrocarbon; and X is a substituted or unsubstituted, monovalent or divalent $C_1$ to $C_{10}$ hydrocarbon having a functional group which preferably includes amino, hydroxyl, mercapto, carboxylic acid or anhydride, carboxyl, phenol, silane, epoxy, acrylate or vinyl. More preferably, X is mercapto, amino or carboxylic acid. Most preferably, X is amino.

Preferably, X has the formula:

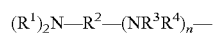

where $R^1$ is hydrogen or monovalent $C_1$ to $C_{10}$ hydrocarbon; $R^2$ is a substituted or unsubstituted divalent $C_1$ to $C_{10}$ hydrocarbon; $R^3$ is hydrogen or monovalent $C_1$ to $C_8$ hydrocarbon; $R^4$ is a divalent substituted or unsubstituted $C_1$ to $C_{10}$ hydrocarbon; and n is 0 to 5.

The branched polysiloxanes of the present invention have a mole ratio of functional group to Si atom range preferably from about 1:5400 to 1:28. More preferably, the mole ratio of functional group to Si atom range from about 1:3800 to 1:44, and most preferably the mole ratio of functional group to Si atom range from about 1:2000 to 1:60.

The viscosity of the branched polysiloxanes may be determined using methods and instruments available and known in the art. For example, the viscosity may be determined using the Brookfield Viscometer available from Brookfield Engineering Laboratories, Inc.

The branched polysiloxanes of the present invention have a viscosity preferably from about 10 to about 200,000 centistokes (cSt) at 25° C. More preferably, the branched polysiloxanes have a viscosity from about 150 to about 100,000 cSt at 25° C., and most preferably, the branched polysiloxanes have a viscosity from about 200 to about 60,000 cSt at 25° C.

The branched polysiloxanes of the present invention have a weight average molecular weight ($M_w$) range preferably from at least about 800,000 to 2,100 Daltons, more preferably from at least about 475,000 to 5,550 Daltons, and most preferably from at least about 150,000 to 9,000 Daltons.

The branched polysiloxanes of the present invention have preferably, a thermal stability of at least about 120° C. More preferably, the branched polysiloxanes have a thermal stability of at least about 130° C., and most preferably, the branched polysiloxanes have a thermal stability of at least about 150° C.

The branched polysiloxanes of the present invention include, but are not limited to, dimethylsiloxane, diphenylsiloxane, methyl-3,3,3-trifluoropropylsiloxane, diphenyl (dimethyl)siloxane, methylphenylsiloxane, or copolymers thereof. Most preferably, the branched polysiloxanes of the present invention is dimethylsiloxane.

The branched polysiloxanes of the present invention may be prepared generally according to conventional siloxane chemistry, such as that described in U.S. Pat. No. 5,915,779 to CRAY et al., U.S. Pat. No. 5,489,482 to MINEMURA et al., U.S. Pat. No. 5,516,361 to CHOW et al., and U.S. Pat. No.5,531,813 to HENRY et al., which are herein incorporated by reference in their entirety. Several specific techniques for preparing these branched polysiloxanes are disclosed here, but it is to be understood that other techniques are also possible.

In particular, the branched polysiloxanes of the present invention may be prepared by condensation of functional linear silanol functional compounds and branched silanol functional materials, or equilibration of functional linear siloxane compounds and branched siloxane compounds, or combination of the two methods.

The branched polysiloxanes of the present invention may be prepared by reacting or equilibrating appropriate molar ratios of functional terminated siloxanes (such as aminopropyl terminated polydimethylsiloxane), functional silanol terminated silane or siloxanes (such as 3-aminopropyldimethylethoxysilane), silanol functional terminated siloxanes (such as silanol terminated polydimethylsiloxane), linear siloxanes (such as polydimethylsiloxane), tri- or tetra-siloxy functional silanes (such as methyltrimethoxysilane or methyltriethoxysilane), and branched siloxanes (such as methyl tris(trimethylsiloxy)silane) in the presence of a basic or acidic catalyst. After the reaction has reached equilibrium, the catalyst may be deactivated or neutralized, and the resultant fluid optionally filtered, and then devolatilized. The fluid is devolatilized using methods known in the art. Preferably, the fluid is devolatilized by sparing with an inert gas in a vacuum with heating, or forming a thin film in a vacuum with heating and trapping the volatiles.

Methods of equilibrating the reactants are not described here in detail, but are known in the art. For its discussion of such methods, pages 356–357 of *Organic Polymer Chemistry* (K. J. Saunders, 1973, Chapman and Hall, London) which is incorporated herein by reference. Furthermore, basic catalysts are preferably used to equilibrate the reactants of the present invention. However, if the functional group to be attached is acidic or unstable in basic solution, acidic catalysts may be used.

Examples of acidic catalysts include hydrochloric acid, sulfuric acid, trifluoromethanesulfonic acid and mixtures thereof.

Examples of basic catalysts include potassium hydroxide, tetraorganoammonium hydroxide (such as tetramethylammonium hydroxide), tetraorganophosphonium hydroxide (such as tetrabutylphosphonium hydroxide), silanoates and mixtures thereof.

In particular, the linear end functional siloxanes may be prepared according to conventional methods known in the art. Discussions of such methods are described on pages 145–164 of *Silicone Based Polymer Science Advances in Chemistry Series* (Vol. 224, 1990), which is herein incorporated by reference. For example, octamethylcyclotetrasiloxane is reacted with 1,3-bis(3-aminopropyl)tetramethyldisiloxane in the presence of a basic catalyst (such as tetramethylammonium hydroxide or tetrabutylphosphonium hydroxide) to efficiently incorporate the aminosiloxane end-capping agent. The branched polysiloxanes are prepared by further incorporating a branching agent, such as a tri-methyl terminated branched siloxane or a multifunctional silanol functional silane or siloxane.

The functional silanol terminated silane or siloxane insures that at least one siloxane unit separates the functional group from the silicone chain. The functional silanol terminated silane or siloxane used in preparing the branched polysiloxanes of the present invention include silanols having the formula:

$$X_1\text{-}M_1\text{-}(Si(M_2)_2\text{-}O)_n\text{-}M_3$$

wherein n is 1 to 2500, more preferably 1 to 1000, and most preferably n is equal to 1. $M_1$ is preferably a divalent $C_1$ to $C_{14}$ substituted or unsubstituted hydrocarbon, more preferably a divalent $C_1$ to $C_{12}$ substituted or unsubstituted hydrocarbon, and most preferably a divalent $C_1$ to $C_{10}$ substituted or unsubstituted hydrocarbon. $M_2$ is preferably a monovalent $C_1$ to $C_{12}$ substituted or unsubstituted hydrocarbon, more preferably a monovalent $C_1$ to $C_{10}$ substituted or unsubstituted hydrocarbon, and most preferably a monovalent $C_1$ to $C_8$ substituted or unsubstituted hydrocarbon. $M_3$ is preferably a monovalent $C_1$ to $C_{12}$ substituted or unsubstituted hydrocarbon, more preferably a monovalent $C_1$ to $C_{10}$ substituted or unsubstituted hydrocarbon, and most preferably a monovalent $C_1$ to $C_8$ substituted or unsubstituted hydrocarbon. $X_1$ is a substituted or unsubstituted, monovalent $C_1$ to $C_{10}$ hydrocarbon having a functional group which preferably includes amino, hydroxyl, mercapto, carboxylic acid or anhydride, carboxyl, phenol, silane, epoxy, acrylate or vinyl. More preferably, $X_1$ is amino, carboxylic acid, mercapto, silane or phenol. Most preferably, $X_1$ is amino.

Preferably, the reactive groups are located on the exterior of the branched polysiloxane, or at the end of a sufficiently long linear portion of a branch without being sterically hindered by the branched chain. For low branching levels, such as 1 to 6 branch points and preferably 2 to 6 branch points, a single siloxane group from the functional silanol provides sufficient separation. For more dense branching, the location of functional groups may be promoted on the exterior of the chain by using a large amount of —OH groups from linear silanol terminated siloxane or disiloxy silanes versus —OH (or —OR wherein R is for example a $M^8$ or $M^9$ hydrocarbon as discussed herein) groups from the branching agent to insure that a substantial amount or majority of the functional silanol groups are reacted to linear chains.

Alternatively, the reactive groups may be added towards the end of the reaction or at least after some or part of the branched chains have formed to prevent the reactive group from directly attaching to a branching agent. Also, this late addition of the reactive group allows it to remain on the exterior portion of the branched polysiloxane where its function is not hampered by the bulk of the chain. Another method is to use functional terminated siloxanes where the reactive group is already located at the end of the existing chain. The end terminated functional chain is incorporated into the branched molecule by equilibration reactions with an existing branched molecule or a reactive —OH terminated siloxane chain.

The functional terminated siloxanes used in preparing the branched polysiloxanes of the present invention include siloxanes having the formula:

$$X_1\text{-}M_4(Si(M_5)_2\text{-}O)_m\text{---}Si(M_5)_2\text{-}M_6\text{-}X_n$$

wherein m is 1 to 2500 and n is 0 or 1, and more preferably m is 1 to 1000. $M_4$ is preferably a divalent $C_1$ to $C_{14}$ substituted or unsubstituted hydrocarbon, more preferably a divalent $C_1$ to $C_{12}$ substituted or unsubstituted hydrocarbon, and most preferably a divalent $C_1$ to $C_{10}$ substituted or unsubstituted hydrocarbon. $M_5$ is preferably a monovalent $C_1$ to $C_{12}$ substituted or unsubstituted hydrocarbon, more preferably a monovalent $C_1$ to $C_{10}$ substituted or unsubstituted hydrocarbon, and most preferably a monovalent $C_1$ to $C_8$ substituted or unsubstituted hydrocarbon. $M_6$ is preferably a monovalent or divalent $C_1$ to $C_{12}$ substituted or unsubstituted hydrocarbon, more preferably a monovalent or divalent $C_1$ to $C_{10}$ substituted or unsubstituted hydrocarbon, and most preferably a monovalent or divalent $C_1$ to $C_8$ substituted or unsubstituted hydrocarbon. $X_1$ is a monovalent $C_1$ to $C_{10}$ substituted or unsubstituted hydrocarbon having a functional group which preferably includes amino, hydroxyl, mercapto, carboxylic acid or anhydride, carboxyl, phenol, silane, epoxy, acrylate or vinyl. More preferably, $X_1$ is amino, carboxylic acid, mercapto, silane or phenol. Most preferably, $X_1$ is amino.

The functional silanol terminated silanes are reacted in combination with siloxy functional silanes and siloxanes. The siloxy functional silanes used in preparing the branched polysiloxanes of the present invention may include tri-siloxy functional silanes having the formula:

$$M_7\text{-}Si(O\text{-}M_8)_3$$

wherein $M_7$ and $M_8$ are preferably monovalent $C_1$ to $C_{12}$ substituted or unsubstituted hydrocarbons, more preferably monovalent $C_1$ to $C_{10}$ substituted or unsubstituted hydrocarbons, and most preferably monovalent $C_1$ to $C_8$ substituted or unsubstituted hydrocarbons. Preferably, the tri-siloxy functional silanes include, but are not limited to, methyl trimethoxysilane and methyl triethoxysilane.

The siloxy functional silanes used in preparing the branched polysiloxanes of the present invention may also include tetra-siloxy functional silanes having the formula:

$$Si(O\text{-}M_9)_4$$

wherein $M_9$ is preferably a monovalent $C_1$ to $C_{12}$ substituted or unsubstituted, hydrocarbon, more preferably a monovalent $C_1$ to $C_{10}$ substituted or unsubstituted hydrocarbon, and most preferably, a monovalent $C_1$ to $C_8$ substituted or unsubstituted hydrocarbon. Preferably, the tetra-siloxy functional silanes include, but are not limited to, tetramethoxysilane and tetraethoxysilane.

The silanol functional silanes and siloxanes used in preparing the branched polysiloxanes of the present invention may include di-siloxy functional silanes and siloxanes. The silanol terminated siloxanes of the present invention include silanol terminated polydimethylsiloxane. The di-siloxy functional silanes used in preparing the present invention may include di-siloxy functional silanes having the formula:

$$Si(M_{10})_2(O\text{-}M_{11})_2$$

wherein $M_{10}$ and $M_{11}$ are independently a monovalent $C_1$ to $C_{12}$ substituted or unsubstituted, hydrocarbon, preferably a monovalent $C_1$ to $C_{10}$ substituted or unsubstituted hydrocarbon, and most preferably, a monovalent $C_1$ to $C_8$ substituted or unsubstituted hydrocarbon. Preferably, the di-siloxy functional silanes include, but are not limited to, dimethlydimethoxysilane and dimethlydiethoxysilane.

End caps such as trimethyl end groups are added using mono-siloxy functional silanes (such as trimethyl ethoxysilane) or by equilibration with siloxanes containing the desired end caps (such as hexamethyldisiloxane or trimethyl terminated polydimethylsiloxane). Cyclic siloxanes may be incorporated to increase the molecular weight or extend the chains using the appropriate catalyst (such as tetramethylammonium hydroxide or tetrabutylphosphonium hydroxide).

These branched polysiloxanes are incorporated with a functional silanol or a functional siloxane to prepare the mono-end functional terminated branched siloxanes. The proportions of the reactants are adjusted to prevent substantial amounts of multifunctional chains, prevent poor distribution of branch points, prevent gel formation, and to promote terminating the chain ends with trimethyl groups. Preferably, the branching agents do not react with each other, but serve as branch points for linear portions of the branched chain. One method of reducing undesired condensation of the branch points is to provide a large amount of —OH groups from linear di-end terminated silanes or siloxane chains versus —OH (or —OR wherein R is a hydrocarbon as discussed above) groups form the branching agent. This ensures that a substantial amount or majority of the branching agent ends are reacted to linear chains. Tri- and tetra-siloxy functional silanes are prone to precipitation from non-polar solutions if fully ionized by the catalyst, or if extensive self condensation occurs. This may be minimized by allowing some of the tri- and tetra- siloxy functional silanes to condense with mono- and di- siloxy silicones and silanes before elevating the temperature, otherwise reducing the tendency for tri- and tetra- functional silanes to become fully ionized by the catalyst, minimizing the concentration of tri- and tetra- siloxy silanes, or by enhancing the solubility of the ionized compounds with the addition of polar solvents.

The molecular weight and amount of branching of the branched polysiloxanes of the present invention are controlled by the amount of reactants (such as the branching agent, trimethyl terminated siloxane, and silanol terminated siloxane). To control the molecular weight of the branched polysiloxanes of the present invention, the number of end-capping groups (such as trimethyl end groups of the trimethyl terminated polydimethylsiloxane) must equal the number of branches. This relationship is expressed in the following formula:

$$\text{\# branches} = (1 + [\text{\# of T type branches}] + 2[\text{\# of tetra type branches}])$$

Conversely, for a desired molecular weight and amount of branching, the amount of branching agent and end-capping groups may be adjusted to achieve the desired mono-functionality. For example, the amount of functional siloxane or silane may be lowered to reduce the fraction of branched polysiloxanes residues having more than a single functional group. Preferably, the fraction of branched polysiloxane residues having more than one functional group is less than about 50%. More preferably, the fraction of branched polysiloxane residues having more than one functional group is less than about 20%, and most preferably, the fraction of branched polysiloxane residues having more than one functional group is less than about 10%.

The branched polysiloxanes of the present invention may also be prepared by equilibration of functional terminated linear siloxane with a non-functional branched siloxane by combination of the two components in the appropriate molar ratio in the presence of a catalyst. The desired amount of branched chains having more than one functional group may be limited or minimized by reducing the amount of functional linear polysiloxane relative to the amount of branched siloxane.

Non-functional branched siloxanes comprising tris or tetrakis siloxy units useful for preparing branched polysiloxanes include those with the general formula:

$$(D_aT_b),$$

wherein
D is

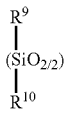

where $R^9$ and $R^{10}$ are independently halogenated or unhalogenated $C_1$ to $C_{10}$ monovalent hydrocarbon or substituted or unsubstituted $C_1$ to $C_{10}$ monovalent hydrocarbon;
T is $$(R^{11})_dSiO_{(4-d)/2}$$

where $R^{11}$ is a substituted or unsubstituted monovalent $C_1$ to $C_{10}$ hydrocarbon; wherein the polysiloxane is end-capped by

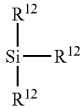

where $R^{12}$ is a substituted or unsubstituted monovalent $C_1$ to $C_{10}$ hydrocarbon; and wherein a is 0 to 5000, b is 1 to 100 (and preferably 2 to 100), d is 0 or 1; and wherein $T_b$ is randomly distributed in the branched siloxane.

Suitable branched siloxanes comprising tris units include methyl tris(trimethlysiloxy)silane or methyl tris(trimethlysiloxy)disiloxane, or derivatives thereof.

Suitable branched siloxanes comprising tetrakis units include tetrakis(trimethylsiloxy)silane or tetrakis(trimethlysiloxy)disiloxane, or derivatives thereof.

Suitable branched siloxanes comprising tris or tetrakis units include those prepared by incorporation of a cyclic siloxane monomer, such as octamethylcyclotetrasiloxane, into branched siloxanes described herein. Branched siloxanes comprising tris or tetrakis units further include those prepared by condensation of siloxy functional silanes including disiloxy, trisiloxy and tetrasiloxy silanes and siloxy or silanol functional siloxanes such as silanol terminated polydimethylsiloxane. Branched siloxanes may further be prepared by a combination of the two methods.

Alternatively, other methods known in the art may be used to prepare the branched polysiloxanes of the present invention. For example, anionic polymerization techniques may be used in a stepwise manner to prepare a linear functional chain, then additional components may be added to prepare branches (such as vinyl functional units).

The process of the present invention may occur in the absence or presence of solvent. Examples of solvents preferably include, but are not limited to, toluene, tetrahydrofuran, ketone, and mixtures thereof. Most preferably, the solvent is absent.

The branched polysiloxanes of the present invention are prepared at a pH range of preferably from about 10 to about 14. In the presence of an acidic catalyst, the branched polysiloxanes of the present invention are prepared at a pH range of preferably from about 2 to about 4.

The branched polysiloxanes of the present invention are prepared at a reaction temperature from about 20° C. to about 180° C., more preferably from about 40° C. to about 140° C., and most preferably from about 60° C. to about 120° C.

In a preferred embodiment, the branched polysiloxanes of the present invention have the formula:

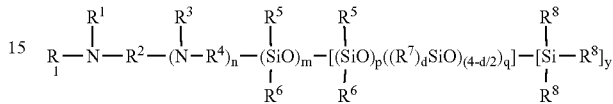

where p is 25 to 5000; q is 1 to 100 (and preferably 2 to 100); p+q is at least 27; $R^1$ is hydrogen or monovalent $C_1$ to $C_{10}$ hydrocarbon; $R^2$ is a substituted or unsubstituted divalent $C_1$ to $C_{10}$ hydrocarbon; $R^3$ is hydrogen or monovalent $C_1$ to $C_8$ hydrocarbon; $R^4$ is a substituted or unsubstituted divalent $C_1$ to $C_8$ hydrocarbon; $R^5$, $R^6$, $R^7$ and $R^8$ are independently monovalent $C_1$ to $C_{10}$ hydrocarbon; n is 0 to 5; m is 1 to 100; d is 0 or 1; and y is sufficient to endcap the polysiloxane chain.

In another preferred embodiment, the branched polysiloxanes of the present invention have the formula:

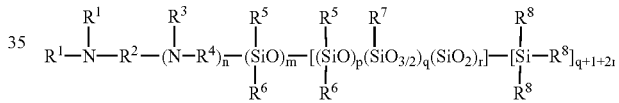

where p is 25 to 5000; q is 1 to 100(and preferably 2 to 100); p+q+r is at least 27; $R^1$ is hydrogen or monovalent $C_1$ to $C_{10}$ hydrocarbon; $R^2$ is a substituted or unsubstituted divalent $C_1$ to $C_{10}$ hydrocarbon; $R^3$ is hydrogen or monovalent $C_1$ to $C_8$ hydrocarbon; $R^4$ is a substituted or unsubstituted divalent $C_1$ to $C_8$ hydrocarbon; $R^5$, $R^6$, $R^7$ and $R^8$ are independently monovalent $C_1$ to $C_{10}$ hydrocarbon; n is 0 to 5; m is 1 to 100; and r is 0 to 100. More preferably, the branched polysiloxanes of the present invention have the formula:

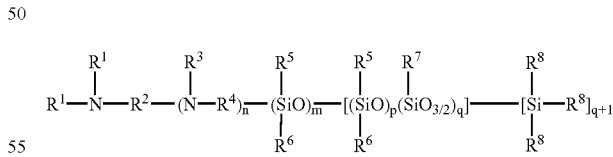

where p is 50 to 2000; q is 1 to 20(and preferably 2 to 20); p+q is at least 52; d is 1 or 2; $R^1$ is hydrogen or monovalent $C_1$ to $C_{10}$ hydrocarbon; $R^2$ is a substituted or unsubstituted divalent $C_1$ to $C_{10}$ hydrocarbon; $R^3$ is hydrogen or monovalent $C_1$ to $C_8$ hydrocarbon; $R^4$ is a substituted or unsubstituted divalent $C_1$ to $C_8$ hydrocarbon; $R^5$, $R^6$, $R^7$ and $R^8$ are independently monovalent $C_1$ to $C_{10}$ hydrocarbon; n is 0 to 1; and m is 1 to 100. Most preferably, the branched polysiloxanes of the present invention have the formula:

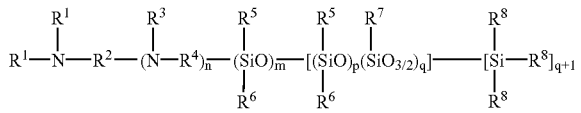

where p is 50 to 300; q is 1 to 20 (and preferably 2 to 20); p+q is at least 52; d is 1 or 2; $R^1$ is hydrogen or monovalent $C_1$ to $C_{10}$ hydrocarbon; $R^2$ is a substituted or unsubstituted divalent $C_1$ to $C_{10}$ hydrocarbon; $R^3$ is hydrogen or monovalent $C_1$ to $C_8$ hydrocarbon; $R^4$ is a substituted or unsubstituted divalent $C_1$ to $C_8$ hydrocarbon; $R^5$, $R^6$, $R^7$ and $R^8$ are independently monovalent $C_1$ to $C_{10}$ hydrocarbon; n is 0; and m is 1 to 50.

In still another preferred embodiment, the branched polysiloxanes of the present invention have the formula:

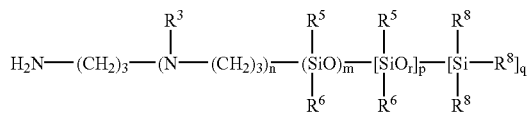

where $R^3$ is hydrogen or monovalent $C_1$ to $C_8$ hydrocarbon; $R^5$, $R^6$, and $R^8$ are independently monovalent $C_1$ to $C_{10}$ hydrocarbon; n is 0 to 5; m is 1 to 100; p is 25 to 5000; r is 1.1 to 1.001; and q is 2 to 100 or sufficient to endcap the polysiloxane chain. More preferably, $R^3$ is hydrogen or monovalent $C_1$ to $C_8$ hydrocarbon; $R^5$, $R^6$, and $R^8$ are independently monovalent $C_1$ to $C_{10}$ hydrocarbon; n is 0 to 3; m is 1 to 75; p is 40 to 4000; r is 1.1 to 1.001; and q is 2 to 60. Most preferably, $R^3$ is hydrogen or monovalent $C_1$ to $C_8$ hydrocarbon; $R^5$, $R^6$, and $R^7$ are independently monovalent $C_1$ to $C_{10}$ hydrocarbon; n is 0 to 1; m is 1 to 50; p is 50 to 3000; r is 1.1 to 1.001; and q is 2 to 20.

Further, in another preferred embodiment, the branched polysiloxanes of the present invention are copolymers having the formula:

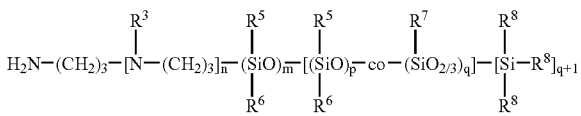

where $R^3$ is hydrogen or monovalent $C_1$ to $C_8$ hydrocarbon; $R^5$, $R^6$, $R^7$ and $R^8$ are independently monovalent $C_1$ to $C_{10}$ hydrocarbon; n is 0 to 5; m is 1 to 100; p is 25 to 2000; and q is 1 to 100(and preferably 2 to 100). More preferably, $R^3$ is hydrogen or monovalent $C_1$ to $C_8$ hydrocarbon; $R^5$, $R^6$, $R^7$ and $R^8$ are independently monovalent $C_1$ to $C_{10}$ hydrocarbon; n is 0 to 2; m is 1 to 75; p is 25 to 1150; and q is 2 to 60. Most preferably, $R^3$ is hydrogen or monovalent $C_1$ to $C_8$ hydrocarbon; $R^5$, $R^6$, $R^7$ and $R^8$ are independently monovalent $C_1$ to $C_{10}$ hydrocarbon; n is 0 to 1; m is 1 to 50; p is 50 to 300; and q is 2 to 20.

Further, in another preferred embodiment, the branched polysiloxanes of the present invention are copolymers having the following formula:

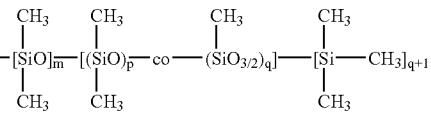

where m is 1 to 100, p is 50 to 2000, q is 1 to 50(and preferably 2 to 50), and p+q is at least 52. More preferably, m is 1 to 75, p is 50 to 1150, q is 2 to 35 and p+q is at least 52. Most preferably, m is 1 to 50, p is 50 to 300, q is 2 to 20 and p+q is at least 52.

Still further, in another preferred embodiment, the branched polysiloxanes of the present invention are copolymers having the following formula:

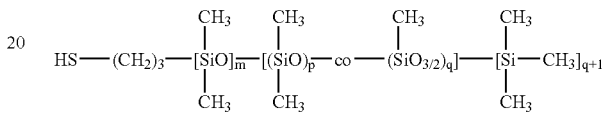

where m is 1 to 100, p is 50 to 2000, and q is 1 to 50 (and preferably 2 to 50). More preferably, m is 1 to 75, p is 50 to 1150, and q is 2 to 35. Most preferably, m is 1 to 50, p is 50 to 300, and q is 2 to 20.

The branched polysiloxanes of the present invention can be used in the process of electrophotography. Specifically, the branched polysiloxanes of the present invention may be used in a composition as a polymeric release agent and/or coating composition to prevent toner adhesion or toner offset. The coating composition or polymeric release agent may be applied continuously as a continuously renewable coating.

The coating composition of the present invention preferably includes a diluent. The diluents may include, but are not limited to, functional polysiloxanes, non-functional polysiloxanes or mixtures thereof known in the art. Preferably, the diluent is a non-functional polydimethylsiloxane optionally having diphenylsiloxane or methylphenylsiloxane groups for increased heat stability. Examples of such diluents include polydimethylsiloxane and poly(dimethyl-co-methylphenyl)siloxane. The branched polysiloxanes may be used in combination with functional or non-functional polysiloxane fluid having a viscosity from about 50 to about 200,000 cSt at 25° C., more preferably from about 150 to about 100,000 cSt at 25° C., and most preferably from about 250 to about 60,000 cSt at 25° C. The branched polysiloxanes may be used in combination with diluents that are solid at ambient temperature, but fluid at operating temperature. The branched polysiloxanes of the present invention in diluent have a final viscosity from about 100 to about 100,000 cSt at 25° C., more preferably from about 150 to about 80,000 cSt at 25° C., and most preferably from about 200 to 60,000 cSt at 25° C.

The final concentration of branched polysiloxane present in diluent is preferably from about 0.5% by weight to about 80% by weight based on the total weight of the coating composition. More preferably, the final concentration of branched polysiloxane present in diluent is from about 1% to about 30%, and most preferably the final concentration of branched polysiloxane present in diluent is from about 2% to about 15%.

The branched polysiloxane of the present invention may also be combined with other oil additives or materials providing that they do not interfere with the action of the functionality of the branched polysiloxane or counteract the advantages of the branched polysiloxanes of the present invention. These additives include, but are not limited to, particulates, waxes, anti-oxidants, stabilizers or additives having compatible functional groups such as fluorinated side chains.

The branched polysiloxanes of the present invention may be applied to any fuser member known in the art. Preferably, the fuser member comprises a substrate and fusing member surface. The fuser member may comprise a fuser member surface upon a base member which may be a hollow cylinder or core made of any suitable metal such as aluminum, steel, nickel, and copper, with the hollow portion having a suitable heating element. The fuser member also includes a fuser member and a pressure member which act cooperatively to contact a copy paper sheet or other substrate allowing toner images thereon to contact the fusing surface of the fuser member. Additionally, a sump is included containing the polymeric release agent which may be solid or liquid at ambient temperature, but fluid during operation of the apparatus.

The fuser member surface may refer to a roll, belt, flat surface or other suitable shaped surface useful in fixing toner to a substrate. The branched polysiloxanes of the present invention may also be used with surfaces, including but not limited to, silicone or fluoropolymer such as fluorocarbon resins (Teflon or perfluoroalkylethers) or fluoroelastomer.

Preferably the branched polysiloxanes of the present invention are used with a fluoropolymer surface. The fluoropolymer may include a fluoroelastomer which is preferably a copolymer of vinylidene fluoride with hexafluoropropylene, copolymer of vinylidene fluoride with teterafluoroethylene and hexafluoropropylene, copolymer of ethylene perfluoroalkylvinylether with teterafluoroethylene, copolymer of ethylene perfluoroalkylvinylether with teterafluoroethylene or mixtures thereof.

The vinylidene fluoride is present in the fluoroelastomer preferably at a concentration range from about 30 to about 90 mole percent. The hexafluoropropylene is present in the fluoroelastomer preferably at a concentration range from about 10 to about 60 mole percent. The tetrafluoroethylene is present in the fluoroelastomer preferably at a concentration range from about 0 to about 50 mole percent.

The fluoroelastomer may further include a filler which may be metal, metal alloy, metal oxide, metal salt, silicon carbide, boron nitride, graphite or silicon dioxide. Preferably, the filler is a metal including, but not limited to, aluminum, tin, silver, zinc, iron, lead, platinum, gold, nickel, chromium or tungsten. Most preferably, the filler is a metal oxide including, but not limited to, aluminum oxide, iron oxide, tin oxide, copper oxide or zinc oxide.

The filler in the present invention may be present in a concentration range preferably from about 0% by volume to about 45% by volume based on the weight of the fluoroelastomer. More preferably, the filler is present in a concentration range from about 0% by volume to about 37% by volume based on the weight of the fluoroelastomer. Most preferably, the filler is present in a concentration range preferably from about 1% by volume to about 35% by volume based on the weight of the fluoroelastomer.

The branched polysiloxanes of the present invention may be applied to the fuser member surface using various methods such as wicking oiler, soaked web, soaked pad oiler, or a donor roll oiler. In a particular embodiment, the branched polysiloxanes of the present invention and fluoropolymer may be individually applied to the fuser member. The fluoropolymer and branched polysiloxanes may further be reacted at a temperature range from about 120° C. to about 240° C., more preferably from about 150° C. to about 220° C., and most preferably from about 170° C. to about 200° C.

In a most preferred embodiment of the invention, the branched polysiloxanes have a viscosity from about 200 to about 60,000 cSt at 25° C.; a weight average molecular weight ($M_w$) range from about 150,000 to about 9,000 Daltons; a mole ratio of the functional group:Si atom from about 1:2000 to about 1:60; wherein the branched polysiloxane is dimethylsiloxane; and wherein the functional group is amino.

In still another most preferred embodiment, the branched polysiloxanes have a viscosity from about 200 to about 60,000 cSt at 25° C., a weight average molecular weight ($M_w$) range from about 150,000 to 9,000 Daltons, a mole ratio of the functional group:Si atom from about 1:2000 to about 1:60, wherein the branched polysiloxane is dimethylsiloxane, the functional group is amino; wherein the diluent includes functional polysiloxane, non-functional polysiloxanes, or mixtures thereof, and the polysiloxanes have a viscosity from about 250 to about 60,000 cSt at 25° C.; and wherein the final concentration of branched polysiloxane in diluent is from about 2% by weight to about 15% by weight, and the viscosity of the branched polysiloxane in diluent is from about 200 to about 60,000 cSt at 25° C.

Further, another most preferred embodiment, the branched polysiloxanes of the present invention have a viscosity from about 200 to about 60,000 cSt, a weight average molecular weight range from about 150,000 to about 9,000 Daltons, a mole ratio of functional group:Si atom range from about 1:2000 to 1:60; wherein the branched polysiloxane is dimethylsiloxane; wherein the functional group is amino; wherein the diluent includes functional polysiloxane, non-functional polysiloxanes, or mixtures thereof, and the polysiloxanes have a viscosity from about 250 to about 60,000 cSt at 25° C.; wherein the final concentration of branched polysiloxane in diluent is from about 2% by weight to about 15% by weight, and the final viscosity of the branched polysiloxane in diluent is from about 200 to about 60,000 cSt at 25° C.; wherein the fluoropolymer is a fluoroelastomer, and the fluoroelastomer comprises copolymer of vinylidene fluoride with hexafluoropropylene, copolymer of vinylidene fluoride with tetrafluoroethylene and hexafluoropropylene, copolymer of perfluoroalkylvinylether with tetrafluoroethylene, copolymer of ethylene perfluoroalkylvinylether with tetrafluoroethylene, or mixtures thereof; wherein the filler is metal oxide, and the metal oxide comprises aluminum oxide, iron oxide, tin oxide, copper oxide, zinc oxide or silicon oxide; and wherein the filler is present in a concentration range from about 1% by volume to about 35% by volume based on the volume of the fluoroelastomer.

Further still, in another most preferred embodiment, the branched polysiloxanes of the present invention have a viscosity from about 200 to about 60,000 cSt, a weight average molecular weight range from about 150,000 to about 9,000 Daltons, a mole ratio of functional group:Si atom range from about 1:2000 to 1:60; wherein the branched polysiloxane has a thermal stability from at least 150° C., and the branched polysiloxane is dimethylsiloxane; wherein the functional group is amino; wherein the diluent comprises functional polysiloxane, non-functional polysiloxanes, or mixtures thereof, and the polysiloxanes have a viscosity from about 250 to about 60,000 cSt at 25° C.; wherein the final concentration of branched polysiloxane in diluent is from about 2% by weight to about 15% by weight, and the final viscosity of the branched polysiloxane in diluent is from about 200 to about 60,000 cSt at 25° C.; wherein the fluoropolymer is a fluoroelastomer, and the fluoroelastomer comprises copolymer of vinylidene fluoride with hexafluoropropylene, copolymer of vinylidene fluoride with tetrafluoroethylene and hexafluoropropylene, copolymer of perfluoroalkylvinylether with tetrafluoroethylene, copolymer of ethylene perfluoroalkylvinylether with tetrafluoroethylene, or mixtures thereof; wherein the filler is metal oxide, and the metal oxide comprises aluminum oxide, iron oxide, tin oxide, copper oxide, zinc oxide or silicon oxide; wherein the filler is present in a concentration range from about 1% by volume to about 35% by volume based on the volume of the fluoroelastomer; and wherein the fluoroelastomer and at least one branched polysiloxane react at a temperature range from about 150° C. to about 200° C.

The preparation of monofunctional branched polysiloxanes and the use of same in electrophotographic applications is illustrated by the examples which follow hereinafter. The examples are presented to illustrate various embodiments of the invention, and should not be construed as limiting the scope thereof. All parts and percentages are by weight, and temperatures in degrees Celsius, unless otherwise indicated.

SPECIFIC EMBODIMENTS OF THE INVENTION

The following materials are used:
Octamethylcyclotetrasiloxane ("D4"), Trimethyl terminated polydimethylsiloxane ("DMS-T03"), and siloxy terminated polydimethylsiloxane ("DMS-S15") are available from Gelest, Inc. of Tulleytown, Pa.
Tetramethylammoniumhydroxide ("TMAH") (as 25 weight % TMAH in methanol) is available from Aldrich Chemical Company, Inc. of Milwaukee, Wis.
Methyl triethoxysilane ("MTES"), 1,3-bis 3-aminopropyldisiloxane, and 1,3 aminopropyl-dimethylethoxysilane, are available from United Chemical Technologies, Inc. of Bristol, Pa.
DC200® polydimethylsiloxane oils (in viscosities of 350, 1,000, and 60,000 centistokes ("cSt")), and octamethyltrisiloxane ("OS-20") are available from Dow Corning Corporation of Midland, Mich.

EXAMPLE 1

Preparation of a Branched Polysiloxane by Condensation Synthesis

A three neck flask is charged with 100 grams of D4, 10 grams of DMS-T03, 85 grams of DMS-S 15, and 4.67 grams of methyl triethoxysilane. TMAH catalyst is added at a ratio of 0.001 gram/100 grams of solution and the mixture is stirred for 1 hour under a nitrogen blanket. A 1.26 gram amount of 1,3 aminopropyldimethylethoxysilane is added to the mixture and the temperature raised to 80° C. for 16 hours. The mixture is then heated to 140° C. for about 10 minutes and cooled. A nitrogen sparge is bubbled through the mixture after heating to 170° C. for 8 hours under vacuum. The product is cooled and filtered. The mixture is determined to have a number average molecular weight of 5200 by size exclusion chromatography, a viscosity of 345 centipoise ("cp") measured using a Brookfield viscometer which gives viscosity in terms of cp, and an amine content of 0.06 meq/gram by titration with HCl.

EXAMPLE 2

Preparation of a Branched Polysiloxane by Equilibration Synthesis

A branched polysiloxane (45 grams) and an amine functionally terminated polydimethyl siloxane (10 grams) (both prepared as described below) are combined in a flask with 0.1 ml of TMAH and heated to about 80° C. for 1 hour. The temperature is then raised to about 180° C. to quench the catalyst. The resulting product is predicted (by simplified well known chemical kinetics) to comprise about 25 percent branched PDMS with an average of 1.5–1.7 branch points. The branched polysiloxane is also predicted to comprise about 40 percent of the branches containing a single functional group at the end of a branch. The fluid has a viscosity of 293 cp, a number average molecular weight (excluding cyclics) of 10900 and an amine content of 0.047 meq/gram.

The branched polysiloxane is prepared by combining in a flask 1.66 grams of a mixture of methyltris(trimethylsiloxy) disiloxane (making up about 90 wt % of the mixture) and methyltris(trimethylsiloxy)silane (10 wt % of the mixture) with 100 grams of D4 and 0.2 ml of TMAH. The mixture is heated under nitrogen to a temperature of 80° C. for three hours, and then to a temperature of 180° C. for thirty minutes to deactivate the catalyst. The resulting branched product is determined to have a molecular weight of about 14000 (excluding cyclics) and a viscosity of about 575 cp. The product comprises about 30–40% branched chains with an average number of about 1.8 to 2 branch points.

The mixture of methyltris(trimethylsiloxy)disiloxane and methyltris(trimethylsiloxy)silane is isolated from a reaction of methyl triethoxysilane with water and trimethylchlorosilane.

The amine functionally terminated polydimethyl siloxane is prepared by placing 75 grams of D4 in a flask with a $N_2$ purge and stirring overnight. The remaining material (74.5 g) is combined with 3.38 grams of 1,3-bis 3-aminopropyldisiloxane and 0.2 ml of (TMAH) and heated to about 170° C. over a time period of about 40 minutes. A clear, viscous fluid results and the mixture is elevated to about 195° C. for about 3 hours. The fluid is placed under vacuum and affixed with a water cooled condenser and trap, and elevated to about 200° C. to remove cyclics. The resulting product has a molecular weight of about 12000 (excluding cyclics), a viscosity of about 330 cp, and an amine equivalent of 0.346 meq/gram.

EXAMPLE 3

A branched polysiloxane and amine functionally terminated polysiloxane are combined substantially the same as Example 2, except in the preparation of the branched polysiloxane only 55 g of D4 are used instead of 100 grams, and in the preparation of the amine functionally terminated polysiloxane only 50 g of D4 are used instead of 74.5 grams. The product has a viscosity of about 140 cp and an amine content of about 0.1 meq/gram.

EXAMPLE 4

A branched polysiloxane and amine functionally terminated polysiloxane are combined substantially the same as Example 2, except in the preparation of the amine functionally terminated polysiloxane 120 grams of D4 are used instead of 74.5 grams. The product has a viscosity of about 640 cp and an amine content of about 0.04 meq/gram.

EXAMPLE 5

A branched polysiloxane and amine functionally terminated polysiloxane are combined substantially the same as Example 2, except in the preparation of the branched polysiloxane 190 grams of D4 are used instead of 100 grams, and in the preparation of the amine functionally terminated polysiloxane 150 grams of D4 are used instead of 74.5 grams. The product has a viscosity of about 1700 cp and an amine content of about 0.026 meq/gram.

EXAMPLE 6

Heat Stability Evaluation

Heat stability is determined by placing 2 grams of a test fluid (the reaction product, without purification, from Example 1) in an aluminum weighing pan and placing it in a convection oven for 24 hours at the indicated temperature. After cooling, the sample is removed and qualitative observations of color and viscosity are made. The branched polysiloxane product of Example 1 shows no significant change at 150° C. or 175° C. after 24 hours, and after 24 hours at 200° C. the material gains a slight yellow color with an increase in the fluid viscosity. The branched polysiloxane product of Example 2 shows no significant change at 150° C. after 24 hours, and after 24 hours at 175° C. the material gains a slight yellow color with no change in the fluid viscosity.

COMPARATIVE EXAMPLE 1

A mono-amine linear polydimethylsiloxane is prepared by combining 1.06 grams OS-20 with 0.95 grams 1,3-bis 3-aminopropyldisiloxane, and 120 grams of D4 in a flask with a nitrogen purge. A 0.2 ml amount of TMAH is added and the solution heated to 80° C. for about 3 hours. The resulting viscous liquid is elevated to about 180° C. to quench the catalyst. The resulting fluid is placed under vacuum with a nitrogen sparge and elevated to about 170° C. for 8 hours. The product has a viscosity of about 400 cp, a number average molecular weight of about 12,000, and an amine equivalent of about 0.77 meq/gram.

EXAMPLES 7–9

Toner Offset Resistance

For Examples 7–9, a monoamine functional branched polydimethylsiloxane of 141, 642, and 1671 cp viscosity respectively, (the products of Examples 3,4 and 5), are separately applied to fuser roller sample surfaces at a concentration of 12.5 wt % in 1,000 cSt DC200 silicone fluid. The excess fluid applied to the surfaces is removed with a lint-free tissue. The fuser roller samples are 1 inch squares of silicone rubber substantially similar to that used in a fuser roller for a Digimaster™ 9110 printer manufactured by Heidelberg Digital, L.L.C. of Rochester, N.Y.

Two roller samples are selected for comparison, and the surface of one is dusted with toner transferred from an unfused image on a paper surface. The sample is placed on a heated stage for 10 minutes at 205° C., then the other sample is placed against the heated, toned surface. The sandwich of fuser material/toner/fuser material is placed under a 20 pounds per square inch ("psi") load and after 20 minutes the two samples are pulled apart and the relative amount of toner transferred to each surface is evaluated. Of the two comparison samples, the sample with superior release characteristics will tend to exhibit less toner remaining on the surface; conversely the sample having relatively less superior release characteristics will tend to have more toner residue. To assure that the sequence of application of toner heating one of the two samples does not influence the results, the test is repeated with two similar samples, however the roles are reversed (for example, if in the first test the sample that is toned and heated is treated with oil 'A' and the comparison sample is treated with oil 'B', then in the second test the toned and heated sample is now the one treated with oil 'B' and the comparison sample is the one treated with oil 'A'). The extent of offset for each sample is determined by qualitative examination of the sample surface following separation.

The following numerical evaluation, corresponding to the amount of toner remaining on the surface to which toner is applied, is employed.

1—0% offset
2—1–20% offset
3—21–50% offset
4—51–90% offset
5—91–100% offset

The comparison between the oils of Examples 7 and 9 is repeated three times, with the qualitative parameter comparison being in run 1—Example 7—"4" and Example 9—"1"; run 2—Example 7 —"5" and Example 9—"1"; and run 3—Example 7—"5" and Example 9—"1".

The comparison between the oils of Examples 7 and 8 is repeated two times, with the qualitative parameter comparison being in run 1—Example 7—"4" and Example 9—"1"; and run 2—Example 7—"5 " and Example 9—"1".

The comparison between the oils of Examples 8 and 9 is repeated two times, with the qualitative parameter comparison being in run 1—Example 8—"3" and Example 9—"2"; and run 2—Example 8—"3" and Example 9—"3".

The data are as follows:

The results of the comparison are also shown in Table I.

TABLE I

| Comparison Oils (Example Nos.) | Results | |
|---|---|---|
| Ex. 7 - Branched Low Viscosity Oil (141 cSt) vs Ex. 9 - Branched High Viscosity Oil (1671 cSt) | Ex. 7 - Low Viscosity Oil –4, 5, 5 | Ex. 9 - High Viscosity Oil –1, 1, 1 |
| Ex. 7 - Branched Low Viscosity Oil (141 cSt) vs Ex. 8 - Branched Mid Viscosity Oil (642 cSt) | Ex. 7 - Branched Low Viscosity Oil –4, 5 | Ex. 8 - Branched Mid Viscosity Oil –1, 1 |
| Ex. 8 - Branched Mid Viscosity Oil (642 cSt) vs Ex. 9 - Branched High Viscosity Oil (1671 cSt) | Ex. 8 - Branched Mid Viscosity Oil –3, 3 | Ex. 9 - Branched High Viscosity Oil –2, 3 |

The results in Table 1 show that the toner offset preventative properties of a higher viscosity branched oil (such as that used in Examples 8 and 9) is preferred over a lower viscosity branched oil (such as that of Example 7).

COMPARATIVE EXAMPLE 2 AND EXAMPLE 10

Toner Offset Resistance

In these examples, a Digimaster™ 9110 electrostatographic printer/copier, manufactured by Heidelberg Digital L.L.C., Rochester, N.Y., is used to test branched polysiloxanes according to the present invention as a release composition to determine their effectiveness in combating toner contamination. Contamination is measured from the toner offset to the cleaning web of the copier as described hereinafter.

For Comparative Example 2, the monoamine linear polydimethylsiloxane employed in Comparative Example 1 is blended into 60,000 cSt DC200 oil at a concentration of 12.5 weight percent and used in place of the standard release oil for the printer/copier.

For Example 10, the monofunctional-branched polydimethylsiloxane of Example 4 (viscosity of 642 cSt) is combined with the 60,000 cSt DC200 oil at a concentration of 12.5 weight percent and used in place of the standard release oil for the printer/copier. The fuser roller employed in the tests is a 35 volume percent iron oxide filled fluoroelastomer roller prepared substantially as described in U.S. patent application Ser. No. 09/879,674, filed Jun. 12, 2001, the teachings of which are incorporated herein by reference in their entirety. Additionally, the web index rate of the printer/copier is increased to twice the standard index rate, and this rate is held constant for both tests. Otherwise, the materials, hardware, and operating parameters of the copier are substantially unchanged.

In its operation, the copier employs two heater rollers to heat the fuser roller. Toner offset from paper in the copying process is removed from the fuser roller by the heater rollers, by virtue of the high surface energy of the anodized aluminum surface of the heater rollers. The indicated cleaning web is a thin Nomex® polymer web, which is used to remove toner that offsets onto the heater rollers by contact with the fuser roller.

With each of the above-described release agent compositions, a test run of 2500 prints is made using an image which duplicates three image strips of multiple toner density. Contamination of the cleaning web after completing 2500 prints is determined by measuring the optical transmission density of toner which collects on the cleaning web surface at the position corresponding to the location of each image density strip. The maximum optical transmission density observed for the strips (highest value of the three strips) is measured using an X-Rite 310 Transmission Densitometer, from X-Rite Company, Grand Rapids, Mich. An average optical transmission density for the strips (based on an average of the values determined for each strip) is also calculated.

The density of the toner offset collected by the cleaning web provides an estimate of the offset rate onto the fuser. As discussed, this offset acts as contamination, and accordingly offset rate indicates the degree of contamination for the fuser.

In making the measurements, clean webs are used to set the measured optical transmission density to zero. As to the results, in general with respect to contamination, cleaning web transmission densities of 0.31 to 0.5 are very good, 0.51 to 0.79 are good, and 0.8 and above could lead to undesirable contamination. The maximum and average web transmission density values obtained from the test with the monoamine linear polysiloxane additive in Comparative Example 2 are 0.81 and 0.46 respectively. The maximum and average web transmission density values obtained with the monoamine branched polysiloxane additive in Example 10 are 0.76 and 0.42 respectively. The branched polysiloxane release fluid provides an improvement in the observed contamination rate.

COMPARATIVE EXAMPLES 3–4 AND EXAMPLE 11

Toner Marking Resistance

An offline fuser, with a pressure roller having an aluminum core and a hard PFA surface layer, is employed for the following examples. The testing is conducted with a fuser roller from an Imagesource™ 110 electrostatographic copier, available from Heidelberg Digital L.L.C., Rochester, N.Y., The release fluids employed are: for Comparative Example 3—a linear polysiloxane release fluid substantially similar to that used with the Digimaster™ 9110 printer/copier described in connection with Comparative Example 2 and Example 10 above; for Comparative Example 4—the monoamine linear polysiloxane as described in Comparative Example 1; and for Example 11—the monoamine branched polysiloxane as described in Example 4. The amine release fluids (those used in Comparative Example 4 and Example 11) are combined before use with 60,000 cSt DC200 silicone fluid at a concentration of 12.5 wt %, while the Digisource release fluid is used as received.

In each example, the fuser roller used is placed in the offline fuser; a controlled amount of the release fluid, i.e., a treating composition, is applied to the fuser roller using a cotton swab, and the fuser roller is rotated until the fluid coating thereon is uniform. The fuser is operated at 176.7° C., with the rollers rotating at a speed of 7 inches per second.

Four sheets of paper are passed through the fuser to deplete the oil film thereon, followed by two toner-bearing sheets which are then collected to evaluate for toner marking. The toned sheets employ a styrene-butylacrylate toner at a toner laydown of 1.0 to 1.25 mg per $cm^2$. Each of the two toned sheets is first conditioned by being placed against a fresh sheet for 48 hours to absorb excess oil. Then each of the two toned sheets is placed face down on a clean sheet, under a 4.14 kg circular weight having a one inch diameter.

The clean sheet is pulled, thereby rubbing it against the toner image on the toned sheet. After pulling the previously clean sheet (now with some toner being abraded thereon), the pulled sheet is evaluated for toner marking. The level of toner marking is measured by taking five reflection density measurements in the one inch diameter contact area, as defined by the indicated weight, of each untoned, pulled sheet. These measurements are made using an X-Rite 310 Photographic Densitometer, from X-Rite Incorporated, Grandville, Mich. For each example, the five measurements for each of the two samples (10 datapoints in total) are averaged, with the results being set forth in Table II under the column "Test 1".

The above test is then substantially repeated and the results obtained are shown in Table II under the column "Test 2".

The reflection density measurements from Test 1 and Test 2 are then averaged to give an overall average reflection density, which is also provided in Table II.

Higher reflection density numbers indicate more transfer of toner, and a greater tendency to cause toner marking.

TABLE II

| Example No. | Description of Release Fluid | Test 1 (average) | Test 2 (average) | Overall Average |
|---|---|---|---|---|
| Comparative Example 3 | Digimaster 9110 release fluid | 31 | — | — |
| Comparative Example 4 | Monoamine linear siloxane | 27 | 18 | 22.5 |
| Example 11 | Monoamine branched siloxane | 11 | 6 | 8.5 |

The results in Table II show a large improvement in the resistance to shear of the toner treated with the branched polysiloxane oil according to the invention.

Although the invention has been described with reference to particular means, materials and embodiments, it is to be understood that the invention is not limited to the particulars disclosed, and extends to all equivalents within the scope of the claims. From the foregoing descriptions, one skilled in the art can easily ascertain the essential characteristics of this invention, and without departing from the spirit and scope thereof, can make various changes and modifications of the invention to adapt to various usages and conditions.

What is claimed is:

1. A branched polysiloxane having the general formula:

$$X\text{-}(D_a)\text{-}(D_b T_c),$$

wherein $X\text{-}(D_a)$ is a linear moiety and $(D_b T_c)$ is a branched moiety
  where X is a substituted or unsubstituted, monovalent or divalent $C_1$ to $C_{10}$ hydrocarbon having a functional group where the functional group comprises amino, mercapto, or carboxylic acid;

where D is

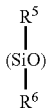

where $R^5$ and $R^6$ are independently halogenated or unhalogenated $C_1$ to $C_{10}$ monovalent hydrocarbon or substituted or unsubstituted $C_1$ to $C_{10}$ monovalent hydrocarbon;
where T is

where $R^7$ is a substituted or unsubstituted monovalent $C_1$ to $C_{10}$ hydrocarbon;
wherein the branched polysiloxane is end-capped by

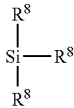

where $R^8$ is a monovalent $C_1$ to $C_{10}$ haloalkyl or an unsubstituted monovalent $C_1$ to $C_{10}$ hydrocarbon; and
wherein a is 1 to 300, b is 25 to 5000, c is 1 to 100, d is 0 or 1; and
$T_c$ is randomly distributed in the branched polysiloxane.

2. The branched polysiloxane of claim 1, wherein X comprises amino.

3. The branched polysiloxane of claim 2, wherein X is

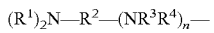

where $R^1$ is hydrogen or monovalent $C_1$ to $C_{10}$ hydrocarbon; $R^2$ is a substituted or unsubstituted divalent $C_1$ to $C_{10}$ hydrocarbon; $R^3$ is hydrogen or monovalent $C_1$ to $C_8$ hydrocarbon; $R^4$ is a divalent substituted or unsubstituted $C_1$ to $C_{10}$ hydrocarbon; and n is 0 to 5.

4. The branched polysiloxane of claim 1, wherein the branched polysiloxane has a mole ratio of functional group: Si atom range from about 1:5400 to 1:28.

5. The branched polysiloxane of claim 4, wherein the branched polysiloxane has a mole ratio of functional group: Si atom range from about 1:2000 to 1:60.

6. The branched polysiloxane of claim 4, wherein the branched polysiloxane has a viscosity from about 10 to about 200,000 cSt at 25° C.

7. The branched polysiloxane of claim 6, wherein the branched polysiloxane has a viscosity from about 200 to about 60,000 cSt at 25° C.

8. The branched polysiloxane of claim 6, wherein the branched polysiloxane has a weight average molecular weight range from about 800,000 to about 2,100 Daltons.

9. The branched polysiloxane of claim 8, wherein the branched polysiloxane has a weight average molecular weight range from about 150,000 to about 9,000 Daltons.

10. The branched polysiloxane of claim 8, wherein the branched polysiloxane comprises a branched dimethylsiloxane, diphenylsiloxane, methyl-3,3,3-trifluoropropylsiloxane, diphenyl(dimethyl)siloxane, methylphenylsiloxane, or copolymers thereof.

11. The branched polysiloxane of claim 10, wherein the branched polysiloxane comprises a branched dimethylsiloxane.

12. A branched polysiloxane having the formula:

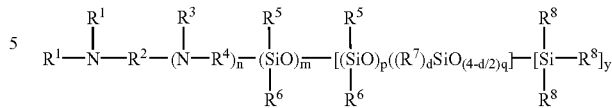

wherein p is 25 to 5000; q is 1 to 100; p+q is at least 27; $R^1$ is hydrogen or monovalent $C_1$ to $C_{10}$ hydrocarbon; $R^2$ is a substituted or unsubstituted divalent $C_1$ to $C_{10}$ hydrocarbon; $R^3$ is hydrogen or monovalent $C_1$ to $C_8$ hydrocarbon; $R^4$ is a substituted or unsubstituted divalent $C_1$ to $C_8$ hydrocarbon; $R^5$, $R^6$, $R^7$ and $R^8$ are independently monovalent $C_1$ to $C_{10}$ hydrocarbon; n is 0 to 5; m is 1 to 100; d is 0 or 1; and y is sufficient to endcap the polysiloxane chain.

13. The branched polysiloxane of claim 12, wherein the branched polysiloxane has the formula:

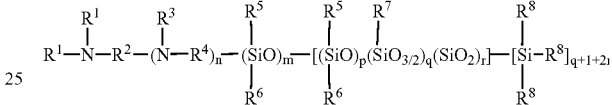

wherein p is 25 to 5000; q is 1 to 100; p+q+r is at least 27; $R^1$ is hydrogen or monovalent $C_1$ to $C_{10}$ hydrocarbon; $R^2$ is a substituted or unsubstituted divalent $C_1$ to $C_{10}$ hydrocarbon; $R^3$ is hydrogen or monovalent $C_1$ to $C_8$ hydrocarbon; $R^4$ is a substituted or unsubstituted divalent $C_1$ to $C_8$ hydrocarbon; $R^5$, $R^6$, $R^7$ and $R^8$ are independently monovalent $C_1$ to $C_{10}$ hydrocarbon; n is 0 to 5; m is 1 to 100; and r is 0 to 100.

14. The branched polysiloxane of claim 13, wherein the branched polysiloxane has the formula:

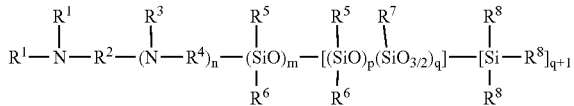

wherein p is 50 to 2000; q is 1 to 20; p+q is at least 52; $R^1$ is hydrogen or monovalent $C_1$ to $C_{10}$ hydrocarbon; $R^2$ is a substituted or unsubstituted divalent $C_1$ to $C_{10}$ hydrocarbon; $R^3$ is hydrogen or monovalent $C_1$ to $C_8$ hydrocarbon; $R^4$ is a substituted or unsubstituted divalent $C_1$ to $C_8$ hydrocarbon; $R^5$, $R^6$, $R^7$ and $R^8$ are independently monovalent $C_1$ to $C_{10}$ hydrocarbon; n is 0 to 1; and m is 1 to 100.

15. The branched polysiloxane of claim 14, wherein the branched polysiloxane has the formula:

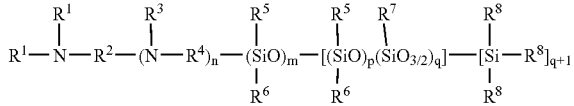

wherein p is 50 to 300; q is 2 to 20; p+q is at least 52; $R^1$ is hydrogen or monovalent $C_1$ to $C_{10}$ hydrocarbon; $R^2$ is a substituted or unsubstituted divalent $C_1$ to $C_{10}$ hydrocarbon; $R^3$ is hydrogen or monovalent $C_1$ to $C_8$ hydrocarbon; $R^4$ is a substituted or unsubstituted divalent $C_1$ to $C_8$ hydrocarbon; $R^5$, $R^6$, $R^7$ and $R^8$ are independently monovalent $C_1$ to $C_{10}$ hydrocarbon; n is 0; and m is 1 to 50.

16. A branched polysiloxane having the formula:

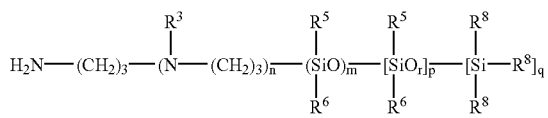

wherein $R^3$ is hydrogen or monovalent $C_1$ to $C_8$ hydrocarbon;

wherein $R^5$, $R^6$, and $R^8$ are independently monovalent $C_1$ to $C_{10}$ hydrocarbon; and wherein n is 0 to 5; m is 1 to 100; p is 25 to 2000; r is 1.1 to 1.001; and q is 2 to 100 or sufficient to endcap the polysiloxane chain.

17. The branched polysiloxane of claim 16, wherein the branched polysiloxane has the formula:

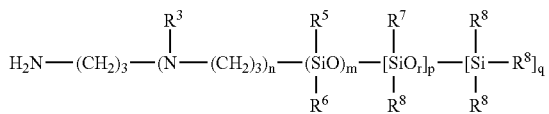

wherein $R^3$ is hydrogen or monovalent $C_1$ to $C_8$ hydrocarbon;

wherein $R^5$, $R^6$, and $R^7$ are independently monovalent $C_1$ to $C_{10}$ hydrocarbon; and wherein n is 0 to 1; m is 1 to 50; p is 50 to 3000; r is 1.1 to 1.001; and q is 2 to 20.

18. A branched polysiloxane which is a copolymer having the formula:

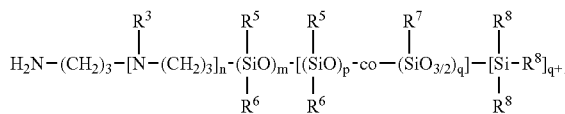

wherein $R^3$ is hydrogen or monovalent $C_1$ to $C_8$ hydrocarbon;

wherein $R^5$, $R^6$, $R^7$, $R^8$ are independently monovalent $C_1$ to $C_{10}$ hydrocarbon; and wherein n is 0 to 5; m is 1 to 100; p is 25 to 2000; and q is 1 to 100.

19. The branched polysiloxane of claim 18, wherein the branched polysiloxane is a copolymer having the formula:

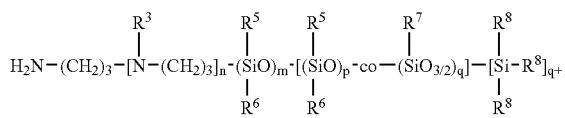

wherein $R^3$ is hydrogen or monovalent $C_1$ to $C_8$ hydrocarbon;

wherein $R^5$, $R^6$, $R^7$, $R^8$ are independently monovalent $C_1$ to $C_{10}$ hydrocarbon; and wherein n is 0 to 1; m is 1 to 50; p is 50 to 300; and q is 2 to 20.

20. A branched polysiloxane which is a copolymer having the formula:

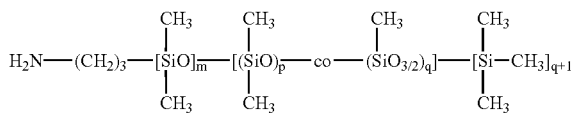

wherein m is 1 to 100, p is 50 to 2000, q is 1 to 50, and p+q is at least 51.

21. The branched polysiloxane of claim 20, wherein the branched polysiloxane is a copolymer having the formula:

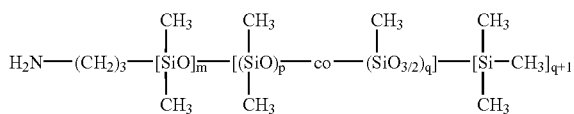

wherein m is 1 to 50, p is 50 to 300, q is 2 to 20, and p+q is at least 52.

22. A branched polysiloxane having the general formula:

$X(D_a)$-$(D_bT_c)$, wherein X-$(D_a)$ is a linear moiety and $(D_bT_c)$ is a branched moiety where X is a substituted or unsubstituted, monovalent or divalent $C_1$ to $C_{10}$ hydrocarbon having a functional group where the functional group comprises amino, mercapto, or carboxylic acid;

where D is

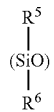

where $R^5$ and $R^6$ are independently halogenated or unhalogenated $C_1$ to $C_{10}$ monovalent hydrocarbon or substituted or unsubstituted $C_1$ to $C_{10}$ monovalent hydrocarbon;

where T is

where $R^7$ is a substituted or unsubstituted monovalent $C_1$ to $C_{10}$ hydrocarbon;

wherein the branched polysiloxane is end-capped by

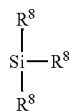

where $R^8$ is a substituted or unsubstituted monovalent $C_1$ to $C_{10}$ hydrocarbon; and wherein a is 1 to 300, b is 25 to 5000, c is 1 to 100, d is 0 or 1; and $T_c$ is randomly distributed in the branched polysiloxane; and wherein the branched polysiloxane has a mole ratio of functional group:Si atom range from about 1:5400 to 1:28, a viscosity from about 10 to about 200,000 cSt at 25° C., a weight average molecular weight range from about 800,000 to about 2,100 Daltons, and a thermal stability of at least about 120° C.

23. The branched polysiloxane of claim 22, wherein the branched polysiloxane has a thermal stability of at least about 150° C.

24. The branched polysiloxane of claim 1, wherein the branched polysiloxane has a viscosity from about 200 to about 60,000 cSt, a weight average molecular weight range from about 150,000 to about 9,000 Daltons, a mole ratio of functional group:Si atom range from about 1:2000 to 1:60;
wherein the branched polysiloxane is dimethylsiloxane; and
wherein the functional group is amino.

25. A fuser member comprising a (a) substrate; (b) fluoropolymer; and (c) polymeric release agent wherein the polymeric release agent comprises at least one branched polysiloxane having the formula:

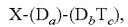

wherein X-(D$_a$) is a linear moiety and (D$_b$T$_c$) is a branched moiety
where X is a substituted or unsubstituted, monovalent or divalent C$_1$ to C$_{10}$ hydrocarbon having a functional group where the functional group comprises amino, hydroxyl, mercapto, carboxylic acid or anhydride, carboxyl, phenol or silane;
where D is

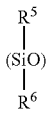

where R$^5$ and R$^6$ are independently halogenated or unhalogenated C$_1$ to C$_{10}$ monovalent hydrocarbon or substituted or unsubstituted C$_1$ to C$_{10}$ monovalent hydrocarbon;
where T is

where R$^7$ is a substituted or unsubstituted monovalent C$_1$ to C$_{10}$ hydrocarbon;
wherein the branched polysiloxane is end-capped by

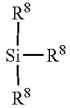

where R$^8$ is a monovalent C$_1$ to C$_{10}$ haloalkyl or an unsubstituted monovalent C$_1$ to C$_{10}$ hydrocarbon;
wherein a is 1 to 300, b is 25 to 5000, c is 2 to 100, d is 0 or 1; and
wherein T$_c$ is randomly distributed in the branched polysiloxane.

26. The fuser member of claim 25, wherein X comprises mercapto, amino or carboxylic acid.

27. The fuser member of claim 26, wherein X comprises amino.

28. The fuser member of claim 25, wherein the fluoropolymer comprises a fluoroelastomer or a fluorocarbon resin.

29. The fuser member of claim 28, wherein the fluoroelastomer comprises a copolymer of vinylidene fluoride with hexafluoropropylene, copolymer of vinylidene fluoride with tetrafluoroethylene and hexafluoropropylene, copolymer of perfluoroalkylvinylether with tetrafluoroethylene, copolymer of ethylene perfluoroalkylvinylether with tetrafluoroethylene, or mixtures thereof.

30. The fuser member of claim 29, wherein the vinylidene fluoride is present in the fluoroelastomer at a concentration from about 30 to about 90 mole percent.

31. The fuser member of claim 29, wherein the hexafluoropropylene is present in the fluoroelastomer at a concentration from about 10 to about 60 mole percent.

32. The fuser member of claim 29, wherein the tetrafluoroethylene is present in the fluoroelastomer at a concentration from about 0 to about 50 mole percent.

33. The fuser member of claim 28, wherein the fluoroelastomer further comprises a filler.

34. The fuser member of claim 33, wherein the filler is a metal, metal alloy, metal oxide, metal salt, silicon carbide, boron nitride, graphite or silicon dioxide.

35. The fuser member of claim 34, wherein the metal oxide comprises aluminum oxide, iron oxide, tin oxide, copper oxide, zinc oxide or silicon oxide.

36. The fuser member of claim 35, wherein the filler is present in a concentration range from about 0% by volume to about 40% by volume based on the weight of the fluoroelastomer.

37. The fuser member of claim 36, wherein the filler is present in a concentration range from about 1% by volume to about 35% by volume based on the weight of the fluoroelastomer.

38. A fuser member comprising (a) a substrate; (b) fluoropolymer; and (c) polymeric release agent wherein the polymeric release agent comprises at least one branched polysiloxane having the formula:

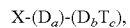

wherein X-(D$_a$) is a linear moiety and (D$_b$T$_c$) is a branched moiety
where X is

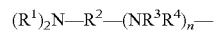

where R$^1$ is hydrogen or monovalent C$_1$ to C$_{10}$ hydrocarbon; R$^2$ is a substituted or unsubstituted divalent C$_1$ to C$_{10}$ hydrocarbon; R$^3$ is hydrogen or monovalent C$_1$ to C$_8$ hydrocarbon; R$^4$ is a substituted or unsubstituted divalent C$_1$ to C$_{10}$ hydrocarbon; and n is 0 to 5;
where D is

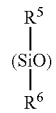

where R$^5$ and R$^6$ are independently halogenated or unhalogenated C$_1$ to C$_{10}$ monovalent hydrocarbon or substituted or unsubstituted C$_1$ to C$_{10}$ monovalent hydrocarbon;
where T is

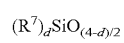

where R$^7$ is a substituted or unsubstituted monovalent C$_1$ to C$_{10}$ hydrocarbon;
wherein the branched polysiloxane is end-capped by

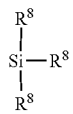
where $R^8$ is a substituted or unsubstituted monovalent $C_1$ to $C_{10}$ hydrocarbon;
wherein a is 1 to 300, b is 25 to 5000, c is 2 to 100, d is 0 or 1; and
wherein $T_c$ is randomly distributed in the branched polysiloxane.
* * * * *